(12) United States Patent
Bova

(10) Patent No.: US 6,675,166 B2
(45) Date of Patent: Jan. 6, 2004

(54) INTEGRATED MULTIDIMENSIONAL DATABASE

(75) Inventor: G. Steven Bova, Baltimore, MD (US)

(73) Assignee: The John Hopkins University, Baltimore, MD (US)

( * ) Notice: Subject to any disclaimer, the term of this patent is extended or adjusted under 35 U.S.C. 154(b) by 153 days.

(21) Appl. No.: 09/727,594

(22) Filed: Dec. 4, 2000

(65) Prior Publication Data

US 2001/0049681 A1 Dec. 6, 2001

Related U.S. Application Data

(60) Provisional application No. 60/181,227, filed on Feb. 9, 2000.

(51) Int. Cl.$^7$ .............................................. G06F 17/30
(52) U.S. Cl. ........................ 707/10; 707/9; 707/104.1; 709/203
(58) Field of Search ............................... 701/1; 706/26, 706/30, 31; 600/300; 707/3, 5, 7, 10, 104.1, 103 Y; 709/203, 204, 205, 225; 713/1; 716/5

(56) References Cited

U.S. PATENT DOCUMENTS

| | | | | |
|---|---|---|---|---|
| 5,721,910 A | | 2/1998 | Unger et al. ............. 707/104.1 |
| 5,765,152 A | * | 6/1998 | Erickson ........................ 707/1 |
| 5,911,132 A | | 6/1999 | Sloane .................... 707/104.1 |
| 5,920,852 A | * | 7/1999 | Graupe ........................ 706/26 |
| 5,966,711 A | | 10/1999 | Adams .................... 707/104.1 |
| 5,966,712 A | | 10/1999 | Sabatini et al. ................. 705/3 |
| 5,970,500 A | | 10/1999 | Sabatini et al. ............. 707/100 |
| 6,256,627 B1 | * | 7/2001 | Beattie et al. ................. 707/1 |
| 6,287,254 B1 | * | 9/2001 | Dodds ........................ 600/300 |

OTHER PUBLICATIONS

Ben Rosen; "Compaq's Commitment to Bioinformatics"; Address by Compaq's CEO; May 18, 1999.
Antonio Regaldo; "Mining the Genome"; M.I.T. *Technology Review*; pp., 57–63; Sep./Oct. 1999.
Holcomb B. Noble; "Hailed as a Surgeon, Koop Criticized on Web Ethics"; *New York Times*; Sep. 4, 1999.
Lawrence Fisher; "The Race to Cash in on the Genetic Code"; *New York Times*; Aug. 29, 1999.
Sara Robinson and Lisa Guernsey; "Microsoft and M.I.T. to Develop Technologies Together"; *New York Times*; Oct. 5, 1999.
Kolata, G and Eichenwald, K., "Health Business Thrives on Unproven Treatment, Leaving Science Behind", New York Times, Nov. 1999.

* cited by examiner

*Primary Examiner*—Safet Metjahic
*Assistant Examiner*—Hassan Mahmoudi
(74) *Attorney, Agent, or Firm*—Fish & Richardson P.C.

(57) ABSTRACT

A method of distributing research data from a common database to a user of the common database is provided. Data concerning research results and data upon which the research results are based are stored in a local database and are linked to each other. Data concerning research results and data upon which the research results are based are selectively extracted from the local database to the common database. Research data are then selected by a user of the common database from the extracted data concerning research results and from the data upon which the extracted data are based and the selected research data are distributed to the user.

21 Claims, 24 Drawing Sheets

List Projects - Add New - Meetings
System Help Admin

Project Manager Functions: Main Menu - Show Active Projects - Add new Project - View Table Info -

View/Update Tables

Current PELICAN Table Information:

SYSTEM: [BLOCK ▼] STATUS: [Ready for front end ▼] [submit]

|   | Table Name | System | Status |
|---|---|---|---|
| 1 | ADDRESS_INFORMATION | | |
| 2 | ADDRESS_TYPE_VALIDATION | | |
| 3 | ANATOMIC_GROUP_VALIDATION | BLOCK | Ready For Front End |
| 4 | ANATOMIC_ORIENT_VALIDATION | BLOCK | Ready For Front End |
| 5 | ANATOMIC_SUB_SUBGRP_VALIDATION | BLOCK | Ready For Front End |
| 6 | ANATOMIC_SUBGROUP_VALIDATION | BLOCK | Ready For Front End |
| 7 | BLOCK_BOX_INFORMATION | | |
| 8 | BLOCK_BOX_TRAY_INFORMATION | | |
| 9 | BLOCK_DECALCIFIER | BLOCK | Ready For Front End |
| 10 | BLOCK_DECALCIFIER_VALIDATION | BLOCK | Ready For Front End |
| 11 | BLOCK_FIXATIVE | BLOCK | Ready For Front End |
| 12 | BLOCK_FIXATIVE_VALIDATION | BLOCK | Ready For Front End |

FIG. 6

ADDRESS_INFORMATION

Project Manager Functions: Main Menu - Show Active Projects - Add new Project - View Table Info - Edit Table Info DO NOT CHANGE TABLE NAME OR ATTRIBUTE NAMES FROM THIS GRID
Primary Key, Show Main and Show Detail are Y/N Fields
Form Name is the name of the field as it will appear on the form.

| | Table Name | Attribute Name | Definition | Type | Primary Key (Y/N) | Show |
|---|---|---|---|---|---|---|
| 1 | ADDRESS_INFORMATION | Address_id | Unique ID for each address instance. | 52 | | |
| 2 | ADDRESS_INFORMATION | Address_type_code | FOREIGN KEY: unique ID for each address type (shipping address, mailing address). | 38 | | |
| 3 | ADDRESS_INFORMATION | street_address_line_1 | Street address for this location. | 39 | | |
| 4 | ADDRESS_INFORMATION | street_address_line_2 | Address Line 2 should contain any non US zip code information such as D-48176. | 39 | | |
| 5 | ADDRESS_INFORMATION | city_name | Full city name. | 39 | | |
| 6 | ADDRESS_INFORMATION | country_code | FOREIGN KEY: unique id for this country. | 38 | | |
| 7 | ADDRESS_INFORMATION | US_state_code | FOREIGN KEY: unique id for each US state. | 39 | | |
| 8 | ADDRESS_INFORMATION | US_zip_code | Zip Code for this address, e.g. 21287. | 39 | | |
| 9 | ADDRESS_INFORMATION | US_zip_code_additional_four | Zip Code 4 number suffix, eg 6417. | 39 | | |
| 10 | ADDRESS_INFORMATION | resource_entity_code | FOREIGN KEY | 38 | | |
| 11 | ADDRESS_INFORMATION | institution_code | FOREIGN KEY | 38 | | |
| 12 | ADDRESS_INFORMATION | supplier_code | FOREIGN KEY | 38 | | |
| 13 | ADDRESS_INFORMATION | manufacturer_code | FOREIGN KEY | 38 | | |
| 14 | ADDRESS_INFORMATION | laboratory_code | FOREIGN KEY | 38 | | |

Sort ASC | Sort DESC
Apply Changes

Project Manager Functions: Main Menu - Show Active Projects - Add new Project - View Table Info -

FIG. 22

INTEGRATED MULTIDIMENSIONAL DATABASE

CROSS REFERENCE TO RELATED APPLICATIONS

This application is related to provisional application Ser. No. 60/181,227 filed on Feb. 9, 2000, which is incorporated herein by reference.

TECHNICAL FIELD

This invention relates to databases, and more particularly to integrated multidimensional databases for managing scientific research data.

BACKGROUND

Researchers have performed experiments on and made observations of biological tissue samples suggesting that a molecular basis for cancer and other diseases might be discovered through careful molecular analysis of such tissues. Such an understanding could permit improvement in the diagnosis, screening, and treatment of disease, and could permit disease treatment to be tailored to the specific molecular defects found in an individual patient. Many different researchers and laboratories study the molecular basis of disease and a large amount of data and information is produced from such studies. Optimization of the handling and integration research results, data, and other information produce and used by various laboratories devoted to studying the molecular basis of cancer and other tissue-based diseases is advantageous for realizing improvements in the understanding and treatment of disease.

Even though many large genomic warehouse databases currently exist, and even though scientific laboratories are connected to the Internet, the data produced by a lab are not necessarily well handled, integrated, validated, searchable, and useable either by the lab producing the data or by another lab that might be interested in using the data. Generally, when data from biological tissue studies are published, only a limited set of the actual primary data (and sometimes none of it) are available for review and reanalysis. Moreover, common language and reference points are often not used for reporting the data. Even in the lab that did the original work, there is often no efficient or robust way to integrate data from a study with previous or subsequent studies. Furthermore, because of space limitations and the difficulty of tracking complex research methods, many published descriptions of laboratory methods do not provide adequate information for another scientist to accurately reproduce an experiment, even though this is a central tenet of scientific publication. The end result is that when taken as a group, the many similar or related studies, while individually illuminating, are isolated and autonomous from each other, and do not achieve potential synergies.

Poor data handling may result in major problems that may slow or possibly prevent real progress in finding better treatment and diagnostic methods for major diseases. In particular, current methods of disseminating information from molecular studies of cancer and other diseases do not allow results from one study to be easily integrated with results from other studies. There is no standard way to link the results of DNA, RNA, and protein-based studies to cellular function or phenotype expression. Current methods of dissemination of the results of molecular studies do not allow preservation of a substantial portion of the original data supporting such studies, making it difficult for researchers to verify the conclusion of a research study or otherwise reinterpret the data.

SUMMARY

In one aspect, generally, a method of distributing research data from a common database to a user of the common database is provided. Data concerning research results and data upon which the research results are based are stored in a local database, with research results linked to the data upon which the research results are based. Data concerning research results and data upon which the research results are based are selectively extracted from the local database to the common database. Research data are then selected by a user of the common database from the extracted data concerning research results and from the data upon which the extracted data are based and the selected research data are distributed to the user.

Implementations may include one or more of the following features. For example, when the research data are distributed, the data concerning research results and the data upon which the research results are based are distributed in a defined database table structure. The distribution of research data may include giving a reviewer electronic access to the data concerning research results and to the data upon which the research results are based. The approval of the reviewer may be required before the research data are publicly distributed.

The data upon which the research results are based may include phenotype data and genotype data. The data upon which the research results are based can include information concerning equipment and supplies used in generating the research results, or information concerning biomaterials used in generating the research results.

Information concerning protocols used in generating the research results may be stored in the local database. The information concerning protocols used in generating the research results may be linked to the data concerning research results and to the data upon which the research results are based. Information concerning protocols used in generating the research results may be selectively extracted from the local database to the common database. Research data selected by a user of the common database from the information concerning protocols used in generating the research results may be distributed to the user.

The data upon which the research results are based may include information concerning equipment and supplies used in generating the research results, and may include information concerning biomaterial used in generating the research results.

In another general aspect, a system for distributing research data may include a processor, an output device for viewing the research data, and memory for storing instructions performed by the processor. The memory includes instructions for storing data concerning research results in a local database, storing data upon which the research results are based in the local database, and linking the data concerning research results to the data upon which the research results are based. The memory also includes instructions for selectively extracting data concerning research results and data upon which the research results are based from the local database to the common database and for distributing to a user of the common database research data selected by the user from the extracted data concerning research results and the data upon which the extracted data are based.

The memory of the system can also include instructions for storing information concerning protocols used in generating the research results in the local database, and for linking the information concerning protocols used in generating the research results to the data concerning research results and to the data upon which the research results are based. The memory can include instructions for selectively extracting information concerning protocols used in generating the research results from the local database to the common database, and for distributing to a user of the common database research data selected by the user from the information concerning protocols used in generating the research results.

In another general aspect, a computer program, residing on a computer-readable medium, for distributing research data includes instructions for causing a computer to store data concerning research results in a local database, store data upon which the research results are based in the local database, and link the data concerning research results to the data upon which the research results are based. The program includes instructions for selective extraction of data concerning research results and data upon which the research results are based from the local database to the common database, and for distributing to a user of the common database research data selected by the user from the extracted data concerning research results and the data upon which the extracted data are based.

Other features and advantages will be apparent from the description and drawings, and from the claims.

DESCRIPTION OF DRAWINGS

FIGS. 5–8 are exemplary screen shots of templates for administering a database application.

FIG. 9 is an exemplary screen shot of a template for searching and storing contact information in a database application.

FIG. 10 is an exemplary screen shot of a template for searching and displaying contact information stored in a database application.

FIGS. 11 and 12 are exemplary screen shots of templates for searching and storing equipment and supply information in a database application.

FIG. 13 is an exemplary screen shot of a template for printing barcodes for equipment and supply from a database application.

FIGS. 14 and 15 are exemplary screen shots of templates for searching and storing biomaterials information in a database application.

FIG. 16 is an exemplary screen shot of a template for storing biomaterials information in a database application.

FIG. 18 is an exemplary screen shot of a template for recording and editing protocol information in a database application.

FIGS. 19 and 20 are exemplary screen shots of templates for creating and displaying protocol information in a database application.

FIG. 22 is an exemplary screen shot of a template for inputting genetic information in a database application

Like reference symbols in the various drawings indicate like elements.

DETAILED DESCRIPTION

Overview

Figure 1:
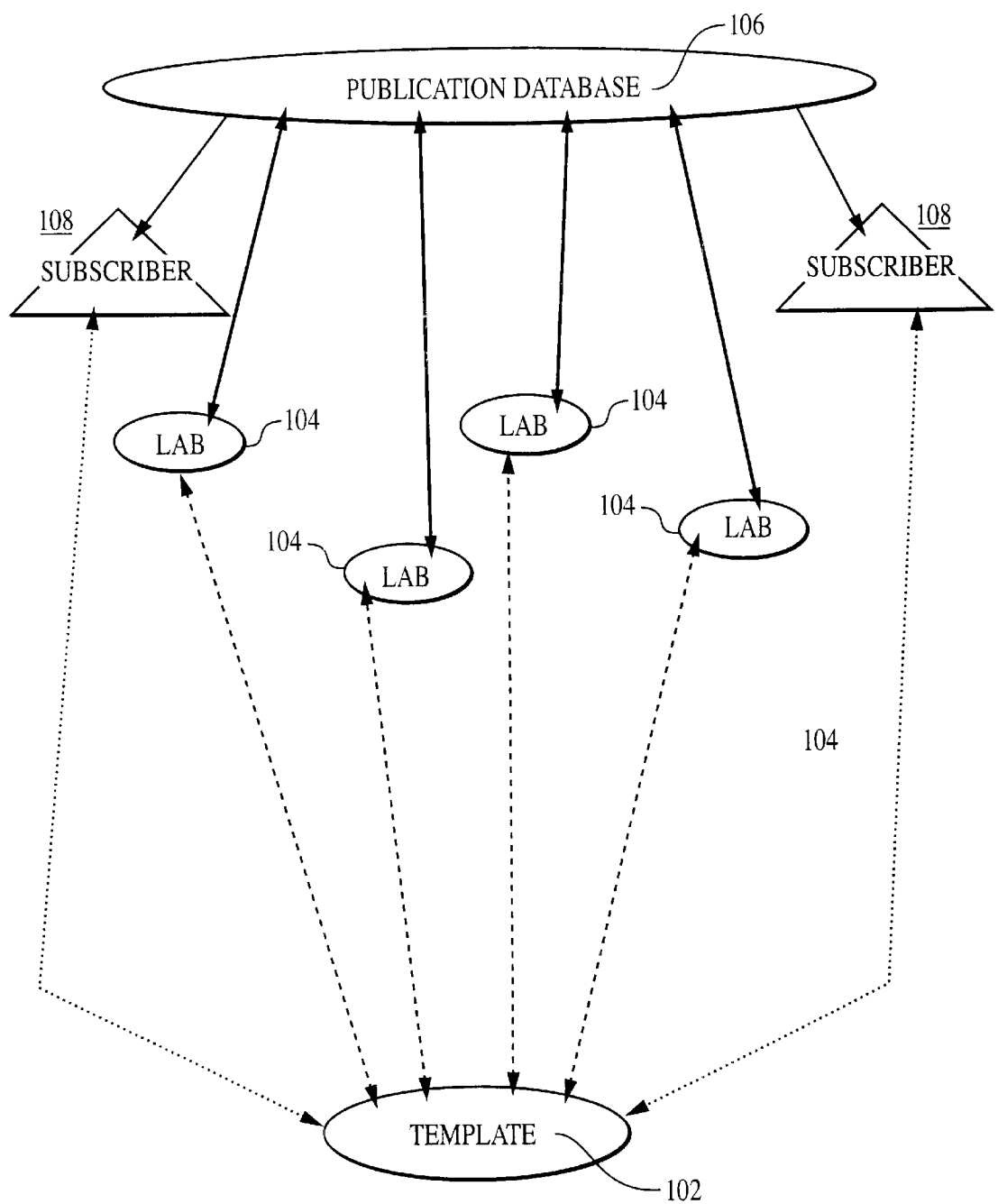
FIG. 1 is a schematic diagram of the relationships between locally maintained databases and a common globally accessible database.

A multi-user, computer-implemented database (DA) allows laboratory (lab) researchers to plan, implement, manage, track, review, and interpret research within the lab as the research occurs. The DA permits the electronic publication of selected data and all supporting information, images, and annotations in database format in a searchable publication database. The data in the publication database may be accessed and used by subscribers to the database or by the general public.

The DA allows automatic integration of complex molecular research data on both a single patient level and a multiple patient level, and provides templates within which molecular data from multiple sources and of various types may be summarized in a fashion that takes advantage of human and computerized pattern recognition abilities. When used in molecular research studies, the DA highlights relationships between genotypes and phenotypes. The DA database application additionally allows users from different institutions and laboratories to compare molecular data from various studies in a highly organized way, to verify the results of existing studies based on the underlying fundamental research data, and to use fundamental research data from existing studies in new studies and to answer different questions than were answered in the studies for which the research data were collected.

The organization of the database is such that the organism under study (human, animal, or other) is central, and each step of the research process is related back to the organism as research occurs. Each step of the process is logically dependent and fully communicative with previous steps. So, for example, to be used in a gene sequencing reaction, a specific tissue reagent (such as a purified DNA sample) is given a unique identifier in the database that is programmatically related to its antecedents (e.g., the tissue block from which it originated, the organ from which it originated, and the patient from which it originated), so that it can be related to all previous and subsequent research involving that tissue reagent. Thus, links between genotype and phenotype are created and maintained.

Although the initial intended use of this DA is for cancer research and related activities, it may be used similarly in support of any body-tissue or body-fluid-based research where biomolecular, clinical, and pathology data need to be integrated, or to plan, manage, organize, display, and interpret data generally. The DA may be implemented on any computer system, including a networked system of computers in which the DA is implemented on the Internet. The DA may be accessible to users through any computer-implemented interface including a web browser interface.

Each laboratory using the database application maintains its own copy of the DA including the front-end scripts and the back-end database shell and has full and exclusive control over what is entered and accessible within its copy of the database. Thus, each laboratory has its own "franchise" to use the database technology and may use the technology as a "palette" with which to organize, test, and keep a record of laboratory research without supervision and in full privacy from laboratory outsiders. Each laboratory using the DA may allow selective access (e.g., via the Internet) to all or portions of its database records to other laboratories or individuals. Thus, a network of collaborating laboratories and their databases is enabled.

When a researcher is ready to make data available to a wider audience, the researcher performs a query on his or her laboratory database to collect the data to be reported. The results of this query (with the tables it draws upon and the specific contents specified by the query) are extracted from the database as a deliverable entity. This corpus of information may be known as a "datamorph" and may include a deeply referenced and detailed version of the information often included in the "Materials and Methods" and "Results" sections of paper and electronic scientific publications. The datamorph, however, may include all phenotype base data and all laboratory protocols used to extract and interpret data from a tissue sample in the query result, as contrasted with an abbreviated description of materials, methods, and selected results used to support a scientific conclusion. All of the results data contained in the datamorph may be linked to accessible data image(s) (e.g., images of cells from a tissue sample or electropherogram images) from which the results are obtained. The researcher may write an introduction and discussion to accompany this "datamorph," and may add appropriate database and literature references. The researcher may then electronically transmit the entire completed datamorph package, including the discussion and reference lists and/or links, to a publication database, where it may be accessible to database users immediately or where it may be placed in a temporary area for review.

The publication database supports data from different laboratory databases and is created and maintained by the same database administrative body that creates the individual laboratory copies of the DA. If the datamorphs are reviewed and/or edited before being made accessible, the editor of the publication database may give confidential and time-limited access to a completed datamorph to appropriate reviewers who then review the datamorph. The editor may give such access by providing the editors with Uniform Resource Locator (URL) links and passwords to view the datamorph in an automated or manual way. Because the database and datamorphs are accessible to remote users and reviewers, a reviewer may complete a review from a remote location and have the completed review forwarded to an editor's attention in an automated fashion. Based on these reviews, an editor may decide whether to obtain more reviews, return the datamorph back to the sender for revision, or enter the datamorph into the publication database for viewing. If the datamorph is entered into the publication database, the completed datamorph is given a specific unique completed datamorph id that allows users of the DA to search the datamorph as a singular entity, in addition to searching portions of the datamorph as part of the entire corpus of published database material.

At the discretion of the editor and the submitter of the completed datamorph, access to specific datamorphs may be controlled so that certain users (e.g., other submitters to the database or financial supporters of the database) are provided earlier access to a specific datamorph. For example, if a completed datamorph is accepted for publication in the database on a specific date, other researchers who have submitted accepted datamorphs to the database within a certain time period prior to this submission may be given immediate access to the newly published datamorph. Subscribers to the database may be given access to the datamorph on a certain date after initial acceptance, and the general public may be given full access at a later date. An abstract of the findings, without full searchable access to the underlying data, may be made available to the general public on an earlier date than full searchable access becomes available.

Other selected users may have direct access to database data. For example, patients or research participants may be given access to data generated from their participation in a study, which may encourage patient participation in research. Patients may particularly benefit from such access when a molecular analysis of tissue samples is performed in order to predict phenotype behavior based on genotype characteristics. Since patients with specific molecular level characteristics may respond better to specific chemotherapeutic or other treatments than other patients without their specific molecular level characteristics, if a patient is given the opportunity to view and compare his or her own tissue sample data to data from other patients, appropriate treatments for the patient may be identified from the other patients' data.

The database front-end scripts and back-end database structures are compatible among different labs' copies of the database, and each lab's copy of the database is compatible with the publication database(s). Database compatibility is maintained by preventing users from changing the back-end or front-end structure of the database locally, or by giving users only limited freedom to make such changes. Thus, all copies of the database application are equal in form and able to communicate on an automated basis. Where appropriate, XML (Extensible Markup Language), SGML (Standard Generalized Markup Language) or other implementation languages may be used in a browser-based implementation of the DA with appropriate style sheets on the front-end to allow interoperability between the database structure and other data formats used by a laboratory. Although XML provides enhanced interoperability, communication through XML allows different users to interact with the database through different front-end and back-end structures and permits the collection, input, and interpretation of data to occur in different environments, and therefore may increase variability in data validation at each laboratory location. Management of the databases is streamlined from the database administrator's perspective, however, if users cannot locally change the database structure or use of style sheets.

Whether or not front-end style sheets are enabled, individual laboratories are not able to change the front-end or back-end database structure (as opposed to its data contents, over which they have full control) on their own, or have only limited capacity to do so. To make this lack of local control over back-end and front-end structure palatable in a research environment, the authority administering the database structure must be highly responsive to users' needs as they arise, and rapid automated updating of both back-end and front-end structures is necessary. To this end, and to encourage user involvement in the development and improvement of the database application, the authority responsible for the database back-end and front-end structures may optionally make the front-end scripts and back-end database structures fully viewable by a user, but unchangeable in the user's registered copy of the front-end and back-end scripts. The user may be permitted to create a temporary copy of the database structures where new ideas for front-end scripting or back-end structure can be tested locally. Protections may be built into the software to prevent the user from copying the registered database or the temporary database and providing it to anyone other than the authority in charge of the template database front-end and back-end structure. The database administrator may provide the user with a clear path to submit suggested improvements to the database, and if a suggestion is accepted and/or incorporated into the database the user may receive a reduction in subscriber fees or other compensation. Disagreements over needed functionality that cannot be agreed upon through discussions may be put up for a vote among users, and/or may be decided by a board of advisors.

Some of the relationships between the template database, the laboratory databases, and the publication database are shown schematically in FIG. 1. A database template 102 is maintained by the institute or other authority charged with its maintenance and improvement. One or more laboratories use their own copies of this database 104 and contribute to a publication database 106, which may also be accessible to non-contributing subscribers using their own copies of this database 108. The solid lines between the laboratory databases and the publication database symbolize the network of communication among the laboratories and other database users via the publication database. The two-headed solid arrows symbolize the transfer of information from an individual lab to the publication database in the form of a completed datamorphs and the retrieval of information from the publication database by the laboratory. Retrieval of information by non-contributing users 108 is symbolized by a one-headed arrow. Two-headed dotted arrows symbolize communication between the database users and the database administrator to develop and improve the database application.

Components of the Database

Figure 2:
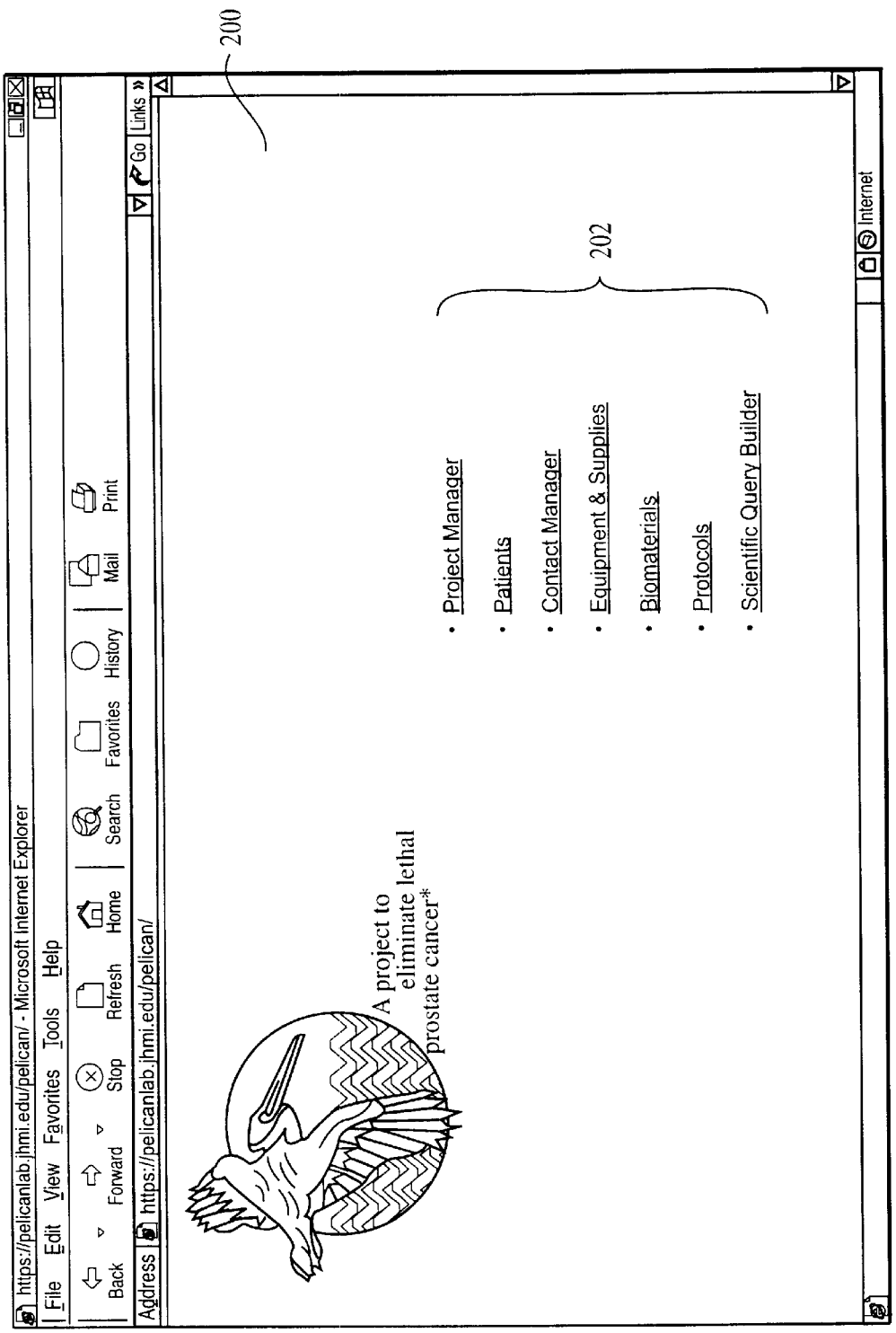
FIG. 2 is an exemplary screen shot of a front page of a database application.

The database application may include multiple templates to receive, organize, manipulate, and present scientific research data. A Project Manager template may be used for storing, organizing, and accessing data related to the DA's internal functionality. A Patients template may be used for storing, organizing, and accessing data related to patients, animals, plants, organisms, and research subjects generally. A Contact Manager template may be used for storing, organizing, and accessing data related to people, companies, and organizations in contact with a laboratory, and to keep track of specific laboratory projects. An Equipment and Supplies template may be used for storing, organizing, and accessing data related to equipment and supplies used during laboratory research. A Biomaterials template may be used for storing, organizing, and accessing data related to tissue, fluids, and other biomaterials used during research. A Protocols template may be used to for storing, organizing, and accessing data that relate to connections, links, and relationships among the aforementioned data, and may be used to analyze existing data and to add new data to the database, while maintaining existing connections, links, and relationships. A Scientific Query Builder template may be used for extracting information from the stored data. These templates may interact with each other so that links between data in the same and different templates may be established by and displayed to users of the database. Referring to FIG. 2, when implemented in a web browser environment (e.g., Microsoft's Internet Explorer™), the functionality of the templates may be accessible to a user through links to the templates 202 from a front page 200 of the DA.

Project Manager Template

Figure 3:
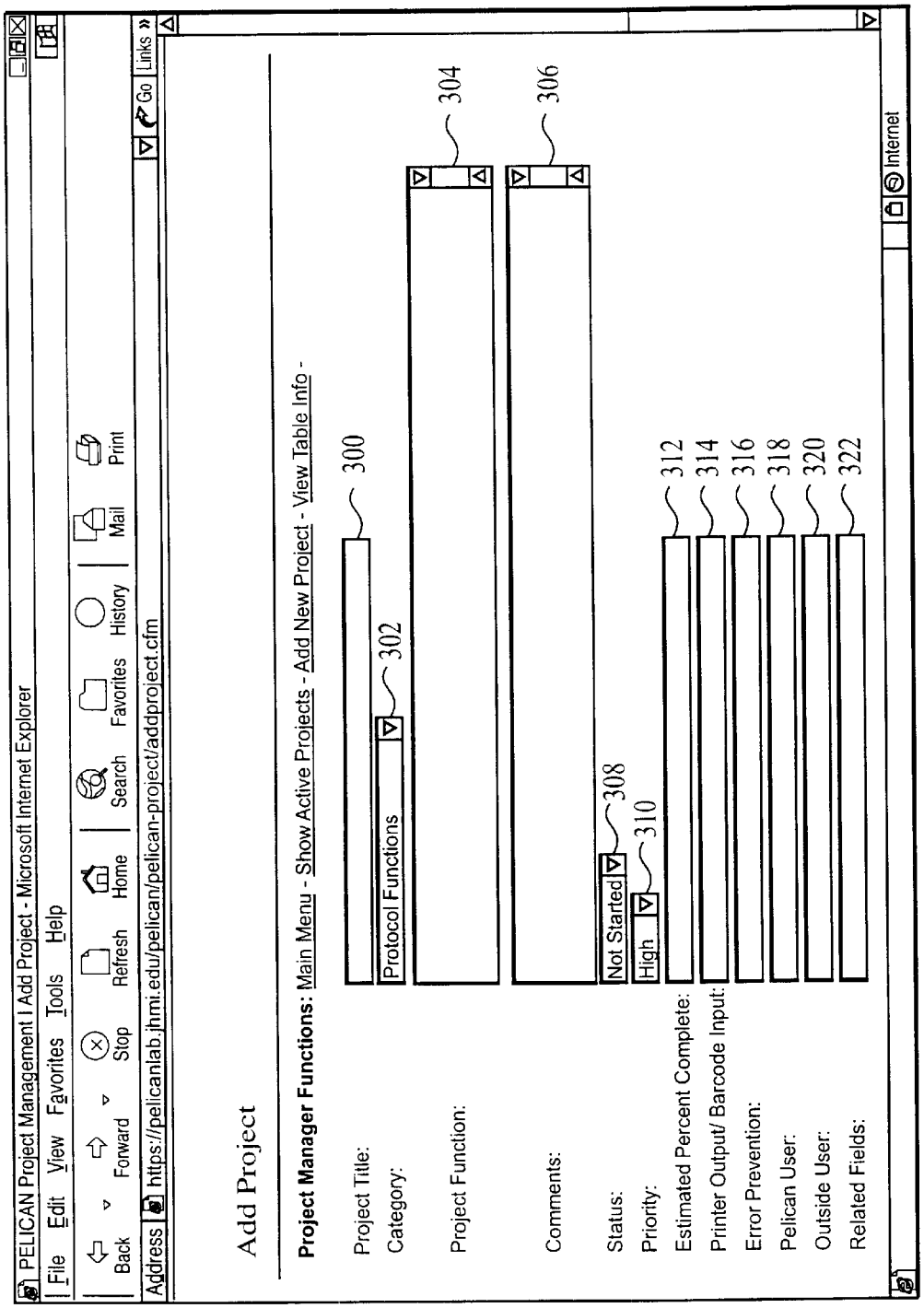
FIG. 3 is an exemplary screen shot of a template for managing a database application.
Figure 4:
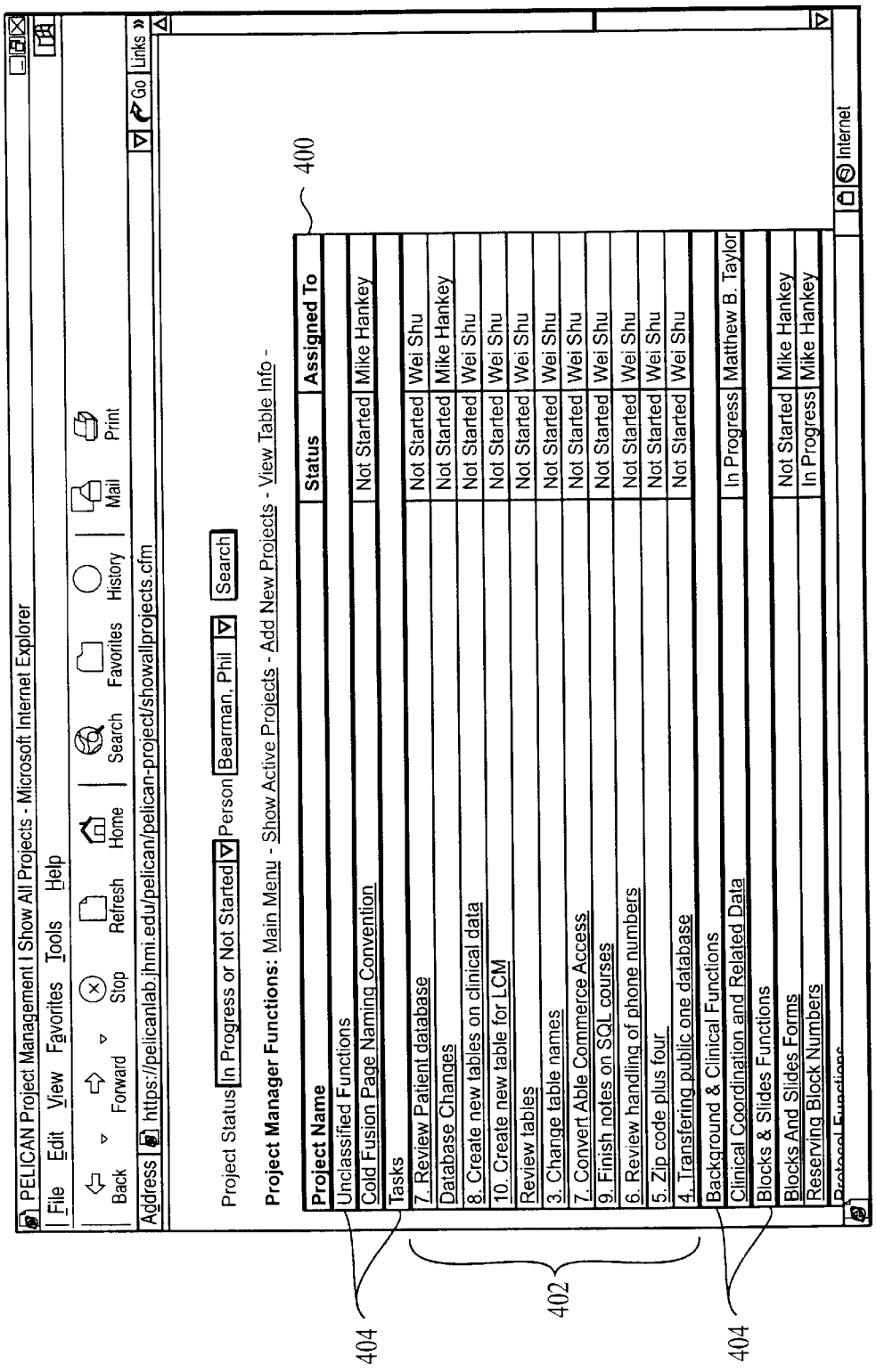
FIG. 4 is an exemplary screen shot of search criteria used in a template for managing a database application.

The project manager template provides a place for laboratory members to maintain data related to, for example, projects, project status, people involved in a project, and records of meetings. Referring to FIG. 3, the template provides input fields for information relating to a project, including name 300, category 302, function 304, comments 306, status 308, priority 310, completeness 312, identification numbers 314, error prevention mechanisms 316, internal laboratory contributors 318, external contributors 320, and related fields 322. Referring to FIG. 4, existing projects that have been entered in the DA can be searched and sorted using one or more of the input fields 400 for the project, including, for example, the project status and the person involved with the project. Hyperlinks to different projects may be displayed and different projects may be sorted by project category 402 and further sorted by project name 404.

Figure 5:
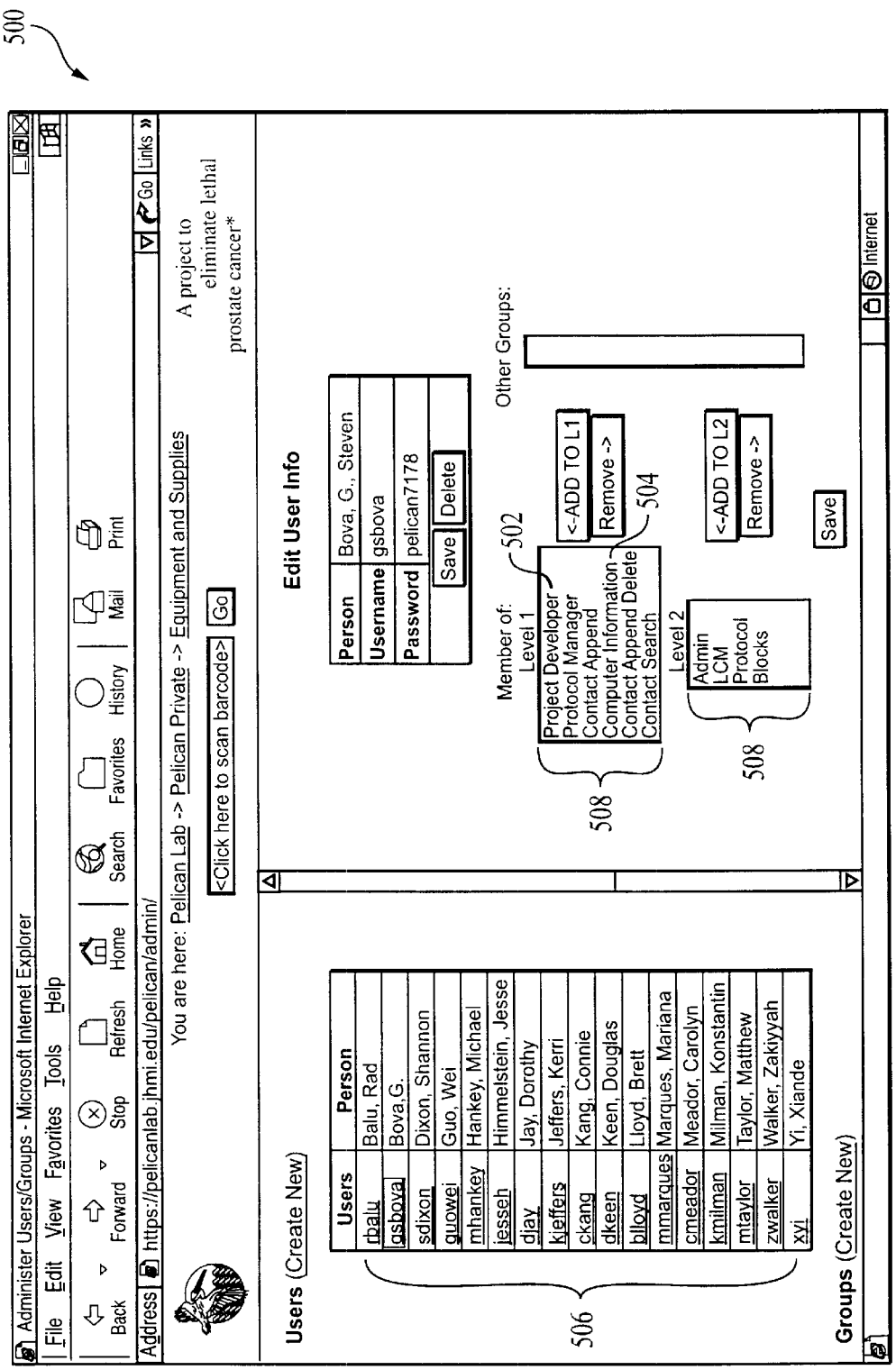

Referring to FIG. 5, the project manager template may also be accessed and modified by a local laboratory database administrator through an "Admin" area 500. A local administrator of the database may control user access to specific applications, portions of applications, and types of data accessible in the DA. For example, as shown in FIG. 5, a user who is a member of the project developer list 502 may have access to different applications 10 than a user who is a member of the computer information list 504. Each laboratory deploying a copy of the template database may designate an administrator responsible for controlling access to the DA by users in the laboratory. The administrator may add or remove a user 506 of the lab database from lists of users 508 who have access to particular applications.

Figure 8:
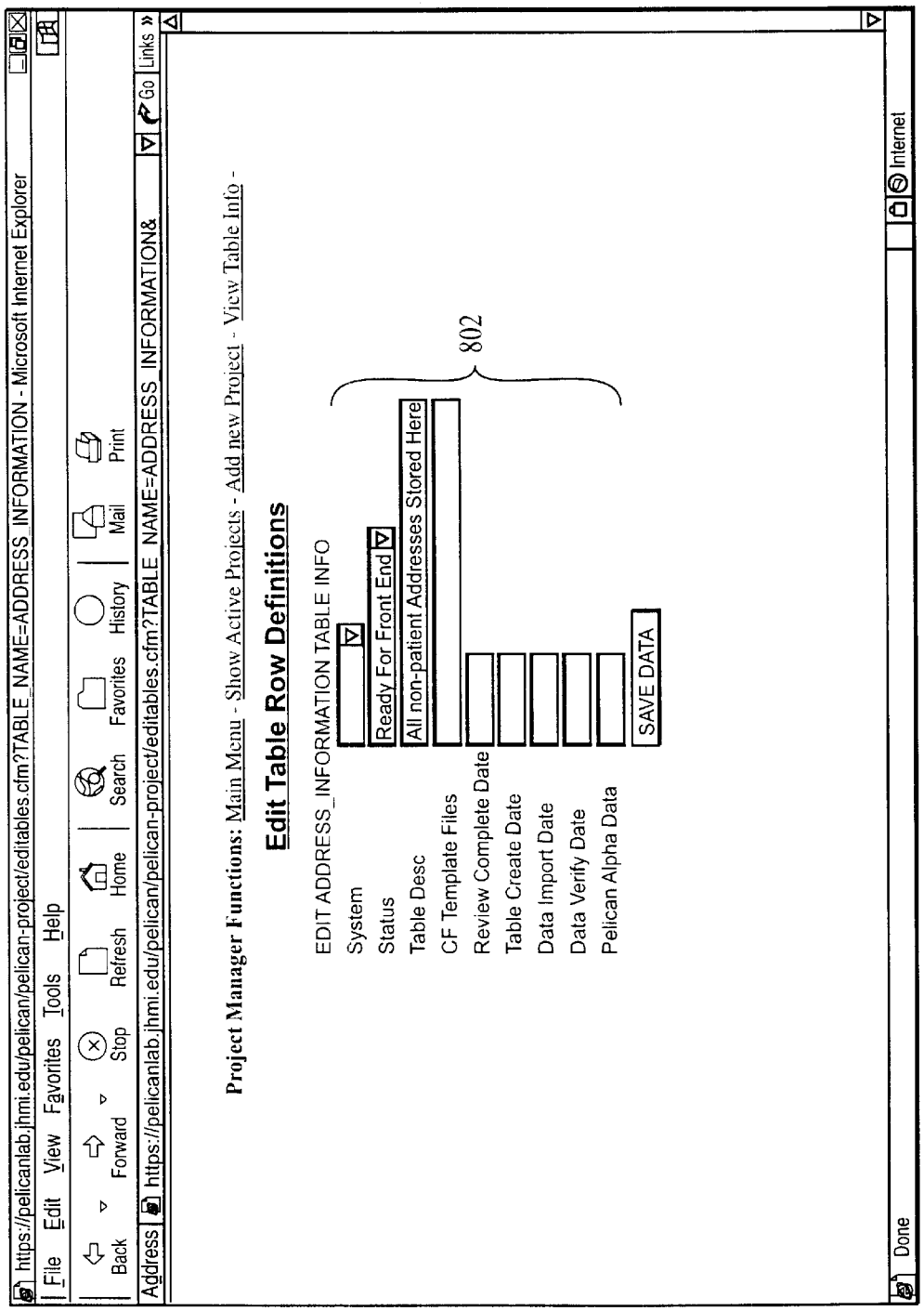

Referring to FIGS. 6–8, the project manager template also allows users with special access to the DA (e.g., a system-wide database administrator) to see the names of the tables 602 within the database. A particular table 604 may be selected (e.g., by clicking on a hyperlink to the table) to display the names 704 and definitions 706 of all the attributes 708 within the table, and the location and names of front-end scripts. Specific attribute definitions of a particular table may be viewed and modified using input fields 802. These functions are retained in the master template database, but are "read only" in the template database provided to laboratories and other non-special users of the DA. Viewing table structures provides a useful reference for users who are trying to understand how data are handled within the database in order to identify ways of improving performance, even if those users do not have authority to modify the table structures. A system-wide database administrator may design and control help messages for this template, which are "read only" in template databases provided to users, but are fully functional in the master template database.

Patients

The Patients template enables efficient collection of appropriate research data from patients and other research subjects and specimens, and encodes the data in a way that permits, when searching the data, telescoping of the data from broad-based data arrays to intermediate arrays to single data points.

Using the Patients template, a clinical coordinator, a physician, or a nurse may manage patient contact information, informed discussion of studies and consent procedures, and collection of clinical data needed for research purposes consenting patients. Data collected may vary according to the study for which they are used, and the template may be adapted to any study or any group of patients. This function supports not only the collection of specific data important for research, but also supports tracking the process of collection of these data. Because collection of patient data often entails contacting numerous physicians' offices, hospitals, and clinics, transferring appropriate consent forms, receiving records, abstracting data from the records, and inputting data into the database, tracking each of these steps through the DA allows study coordinators and directors to improve both the quality and the efficiency of patient data management.

The Patients template may be built to receive and manage data on, for example, prostate cancer patients who give informed consent to participate in a metastatic prostate cancer study. Categories of data collected for such a study may include many that are relatively generic, such as exposure history, occupational history, dietary history, past medical and surgical history, weight, age, family history, and ethnicity. Prostate cancer specific data, such as serum PSA (prostate specific antigen) values and Gleason histological grading data may also be collected. Once the data to be collected and tracked for an individual study are defined, the database template allows easy importation from other databases.

Clinical data may be stored using methodology supporting telescoping from broad-based data arrays to single data points, and suitable for use with pattern recognition algorithms. As an example of clinical data telescoping, a patient's alcohol exposure history may be collected from a patient's answers to a questionnaire and displayed in granular format separating exposure to wine, beer, and liquor and tracking the source of all data stored in the DA. The data may be displayed as a graphic depicting exposure for a patient's year-by-year exposure over his lifetime. This lifetime exposure graphic then may be further condensed to a single color-coded dot depicting his highest exposure level for any one year. Thus, the patient's entire exposure history is telescoped from the highest level of summarization (the dot) to the summary for all types of liquor (the exposure graphic representing exposure for all types of liquor) to the separate graphics for each type of liquor, and so on down to the patient's answers to each question on the questionnaire. By encoding the data and allowing convenient viewing of underlying data in this manner, a discovery tool based on innate human pattern recognition abilities is enabled. Machine-based pattern recognition is also enabled.

For research animals or other non-human organisms under study, a separate link for management of pertinent data relating to them is located adjacent to the link to "patients." Data relating to research involving laboratory animals and other organisms is managed similarly to that of patient data.

Contact Manager

Figure 9:
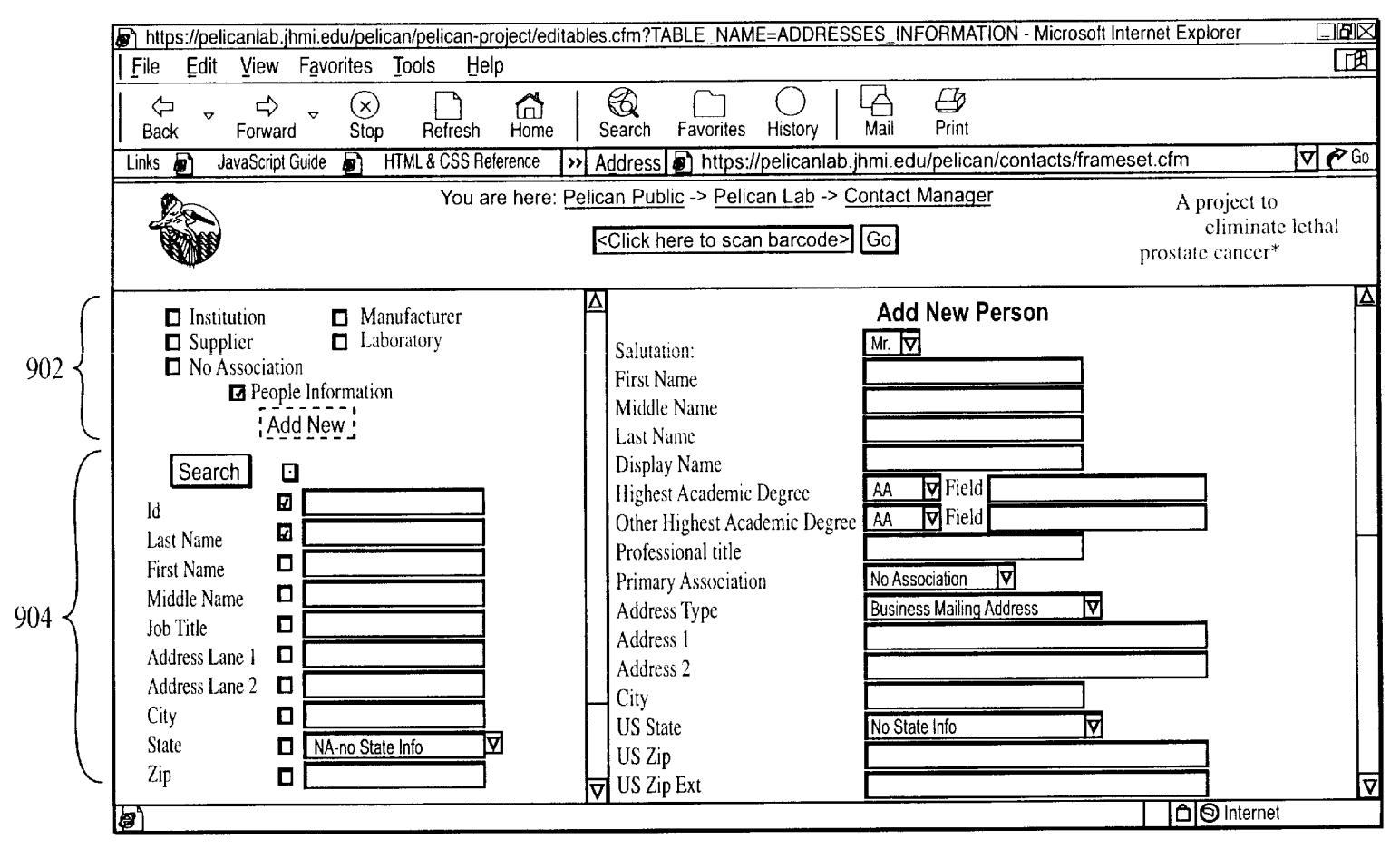
Figure 10:
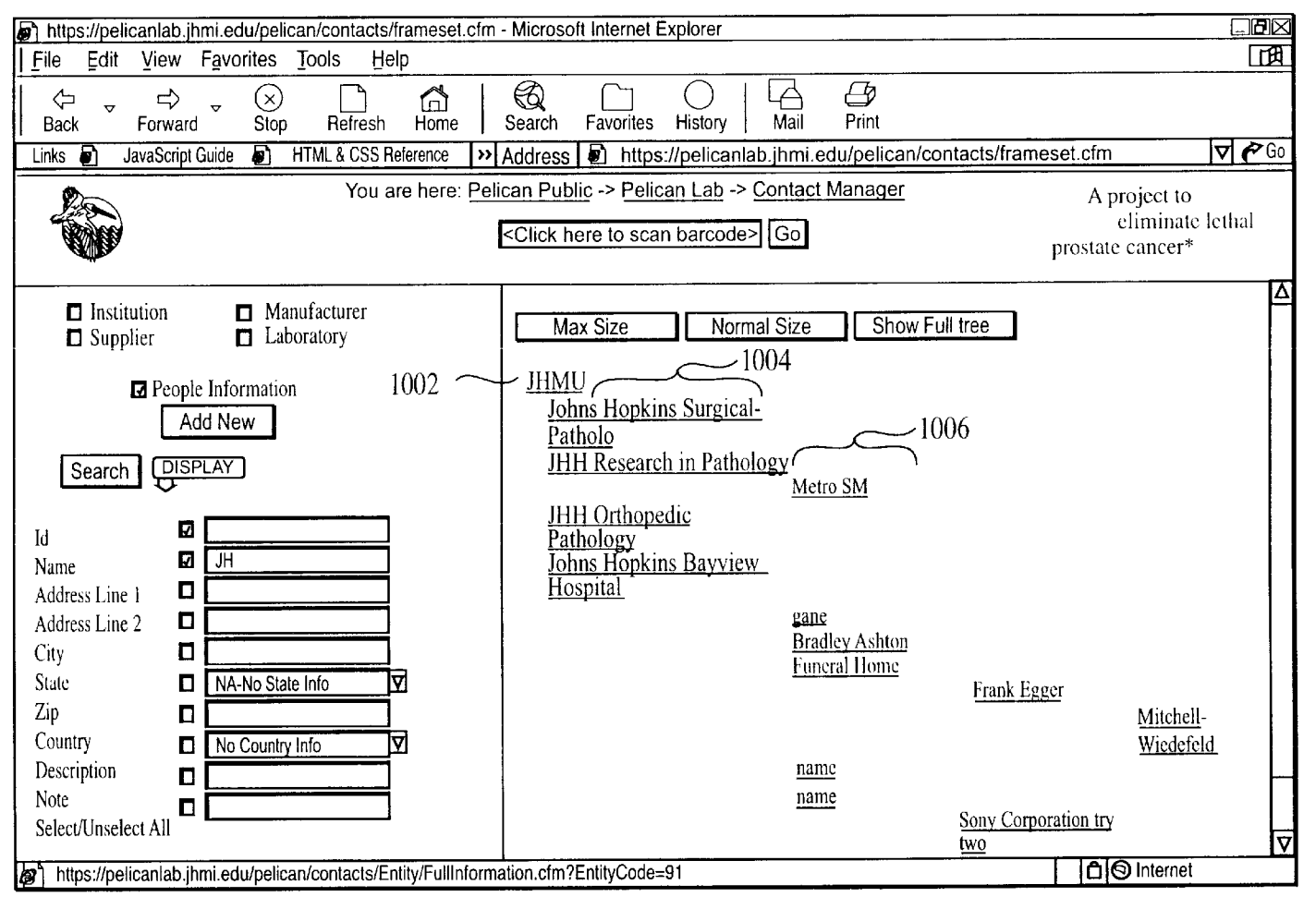

Referring to FIG. 9, the Contact Manager template allows a user to record and/or search contact information for people, institutions, laboratories, suppliers and manufacturers related to laboratory research 902 using a variety of search criteria 904, including name, address, id number, and zip code. Relationships between people and these other entities are maintained in the contact manager template of the DA, so that the DA may be used not only to perform standard text searches of specific fields, but also searches for people affiliated with a certain institution A or for, for example, all the people working in laboratory A. The Contact Manager template also maintains relationships between entities within an organization, so that a tree of relationships can be displayed. Referring to FIG. 10, for example, within an academic medical center, a hierarchical display of the hospital names 1002, department names 1004, and the labs and other offices 1006 within each may be provided with a hyperlink to the phone number, email address, web address, or other contact information for each entity. A similar hierarchy of information is maintained for each address and contact, so that the user can display and search the data types as a series of hierarchical links if desired, with the user clicking on the specific point in the hierarchy desired to obtain information about that point. The information in the Contact Manager may be directly downloadable to personal digital assistants.

Equipment and Supply

The Equipment and Supply template allows a user to search and record data related to equipment, supplies, and reagents used in the laboratory. As used in the DA, equipment is anything purchased or otherwise obtained by the lab and that may be used multiple times in the lab, while a supply is generally nonreusable. A reagent is anything created within the laboratory, using supplies and equipment in the lab. A tissue reagent is a reagent that derives from an organism, and a non-tissue reagent is any reagent that does not derive from an organism.

Figure 11:
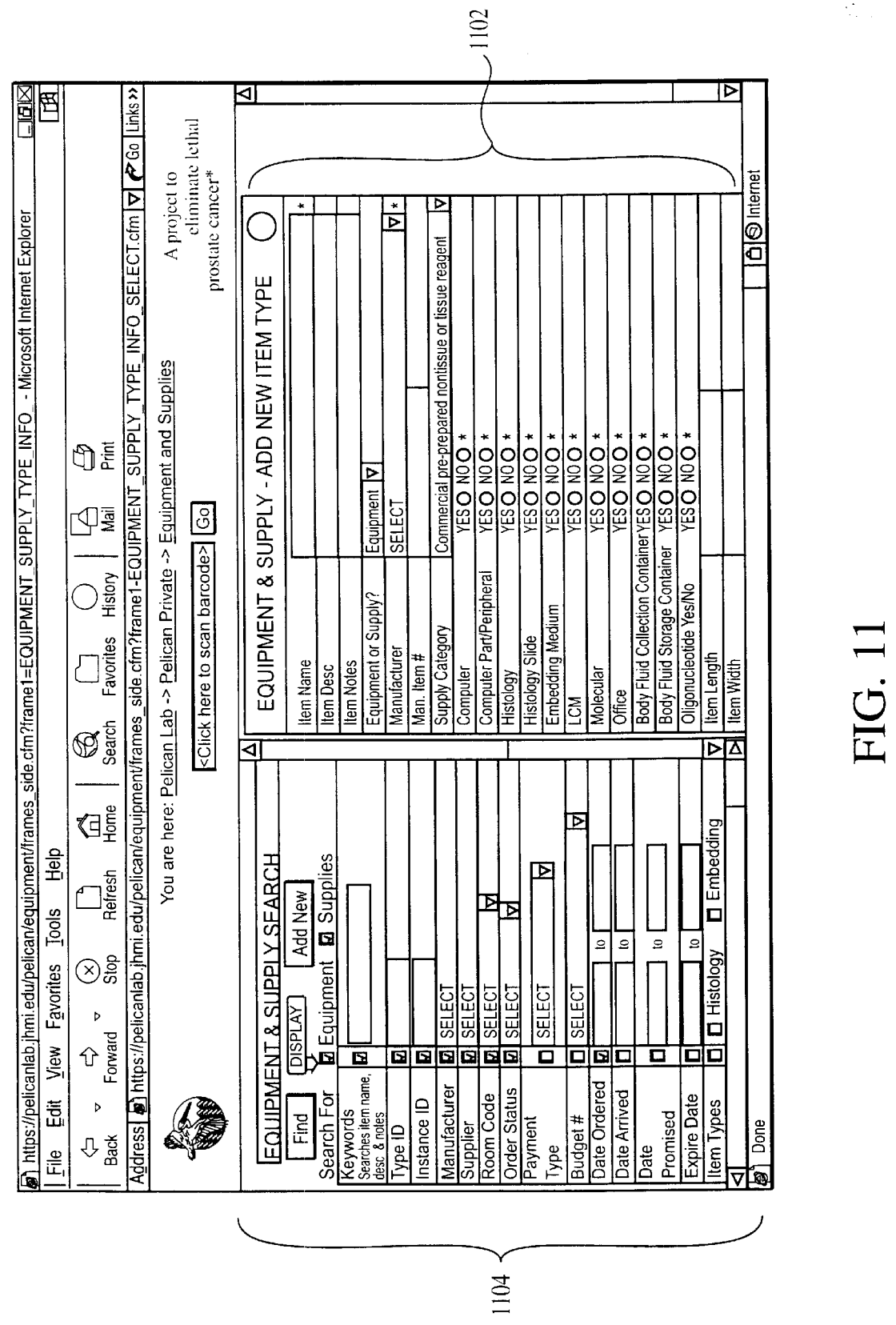

Data may be input to the template when an item is purchased, when it is received, or at a later time, and may include the name, manufacturer, supplier, serial number, cost and budget data, storage location, and other data related to any equipment or supply used in the laboratory. Referring to FIG. 11, the template provides input fields 1102 for a variety of information relating to equipment and supplies and fields for a variety of search criteria 1104 that may be used to retrieve and organize information in the database.

Figure 12:

Equipment and supplies may be categorized as "Types" and "Instances." Unique types of equipment or supplies from a single manufacturer may have a single entry in the database. Each example of a certain type may be recorded as an instance of that item. For example, a Rainin P-10 manual dispensing pipette may be designated as an equipment type produced by a specific manufacturer, with a specific model number. Each of four Rainin P-10 pipettes used by the lab may then be entered in the template as separate instances of that type, with data on, for example, supplier, cost, and storage location stored separately for each instance. A user may search the database attributes recorded for each item type and instance. Referring to FIG. 12, the template may be used to facilitate reordering items that are ordered and used repeatedly in a lab. The user may create a new instance of an item in the template 1202, which copies all the retained data from the previous instance, and prompts the user to specify the price, supplier, and other necessary information for the new instance 1204. Method of payment, including budget numbers, are collected so that the laboratory may to track costs in any way needed for total lab management.

Figure 13:
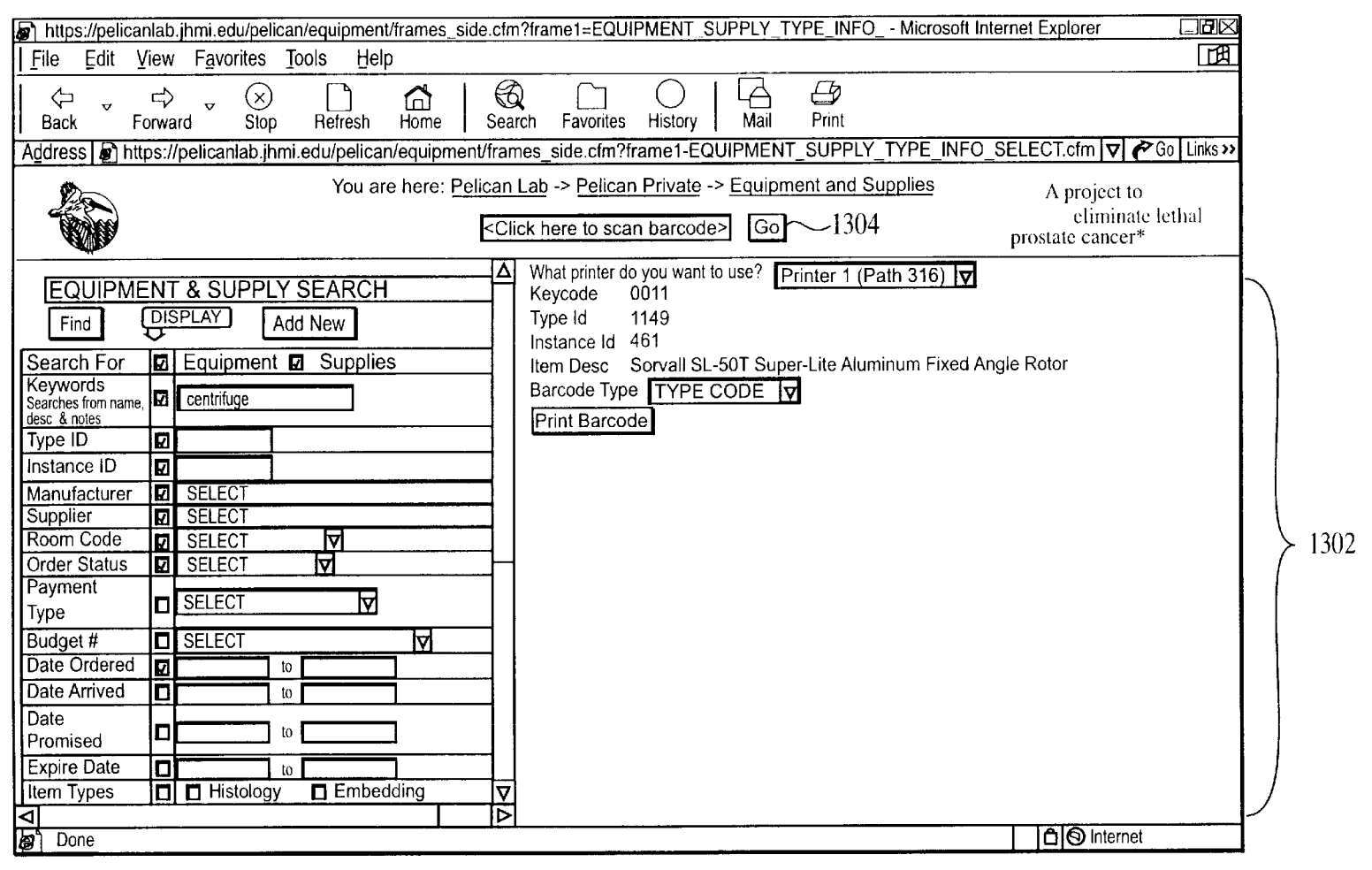

Referring to FIG. 13, the DA may be barcode enabled to allow a user to print a standard barcode encoded label 1302 or to scan in a barcoded item 1304 that subsequently may be automatically located in the database upon entry of the barcode identification number.

To facilitate management of computer resources by network administrators, the Equipment and Supply template may also collect and track computer related data as data are accessed from and transmitted among different laboratory computers connected to a network. A link at the bottom of the right frame of equipment/supply displays computer related data for the laboratory and specific data for each computer can be obtained by clicking on its name there or when it appears as a result of searches using the equipment/supply query engine.

Biomaterials

The biomaterials template allows laboratories to collect and track data related to tissues, which are usually stored as tissue blocks either frozen or embedded in paraffin, and body-fluids that are obtained for study purposes. Each tissue block may be related to its source (patient or other organism), its storage type and location, physical properties, such as the time it was placed in fixative or frozen, species origin, procedure origin, anatomic site of origin, anatomic orientation if available, and whether or not it contains tumor or other pathology. When retrieving biomaterials data from the database a user can select the data parameters desired for viewing tissue or body-fluid data, and when searching the database for biomaterials data the user may search different fields that identify the tissue or body-fluid data.

The DA also makes use of a unique Sentinel grading system with which investigators can categorize tissue blocks on a 1–4 scale. Many studies have a large number of tissue blocks from which to prepare samples for a particular study, and the Sentinel grading system provides a method for marking particular blocks as the source material that is most useful in a study. Using the Block Manager part of the Biomaterial application, the user may prioritize the blocks according to a method of the user's choosing, and may apply a Sentinel number of 1–4 to each one. For example, in an autopsy tissue study, blocks with a Sentinel 1 label may designate the tissue blocks that best represent a disease process (e.g., cancer) in a patient, and which should be included for analysis in all aspects of the study. Sentinel 4 blocks may designate those blocks that are rarely included for analysis in the study, because they do not contain cancer, or because they are of relatively poor quality, and Sentinel 2 and 3 blocks may be blocks that fall in between these two extremes. Since many users of the DA will have an inventory of tissue blocks that need to be entered into the database in order to be used, the data fields are defined in a way that allows entry of a block data from any source, maintaining the block's originally assigned number, but also giving the block a new unique block id.

Figure 14:
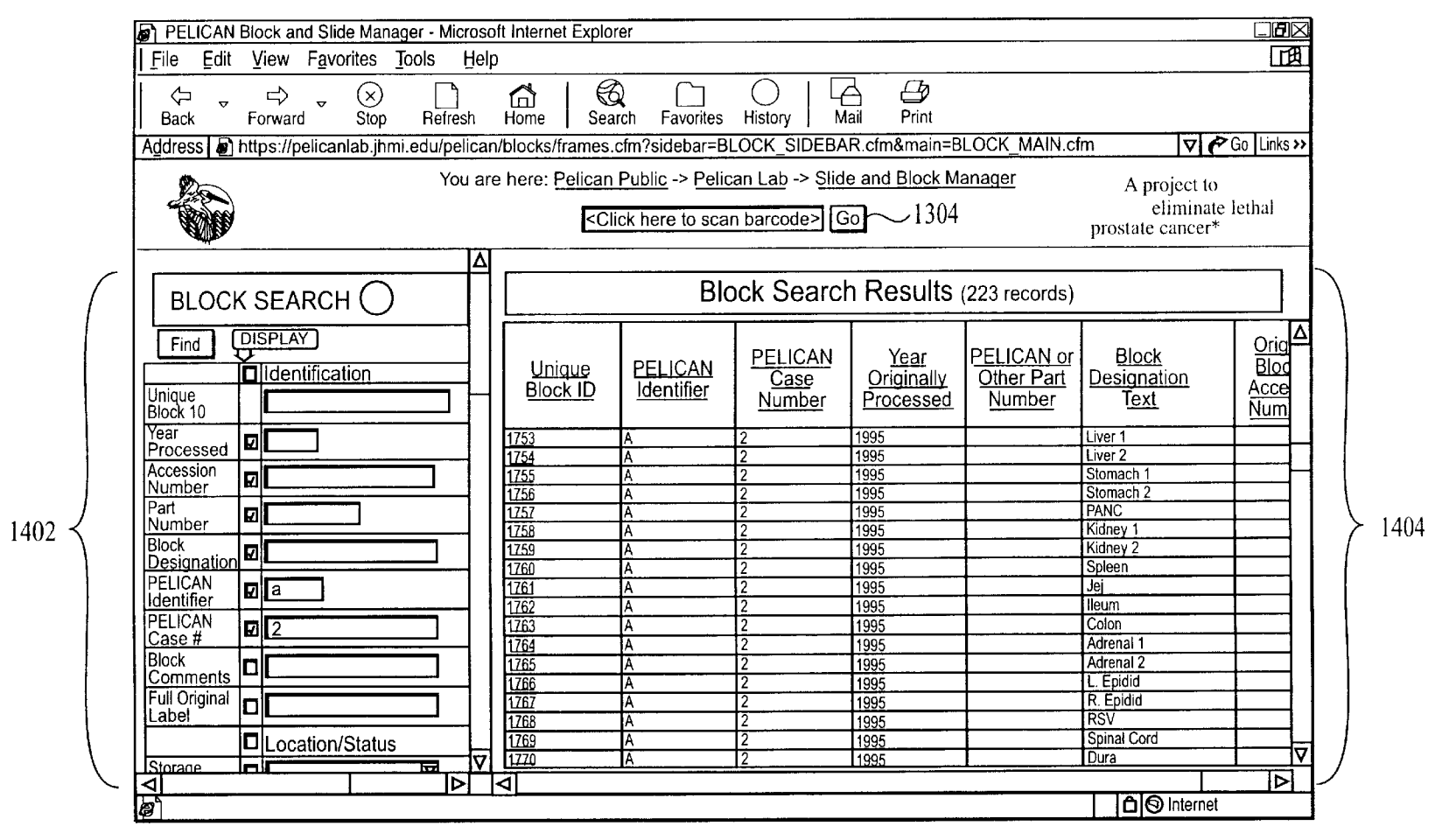

Often in research studies, thin sections are cut from a block of tissue, placed on a glass slide, stained, and coverslipped to allow microscopic analysis. Microscopic images of such tissue slices may be digitized and stored in the database by the DA. Referring to FIG. 14, block data may be searched using a variety of search criteria 1402, and links to block data may be displayed 1404. The DA provides a method to maintain the relationship between the block of tissue and all the slides created from the block. For example, the first slide cut from a tissue block may be designated slide 1, the second slide 2, and so on, and may be link to the tissue block data.

Figure 15:
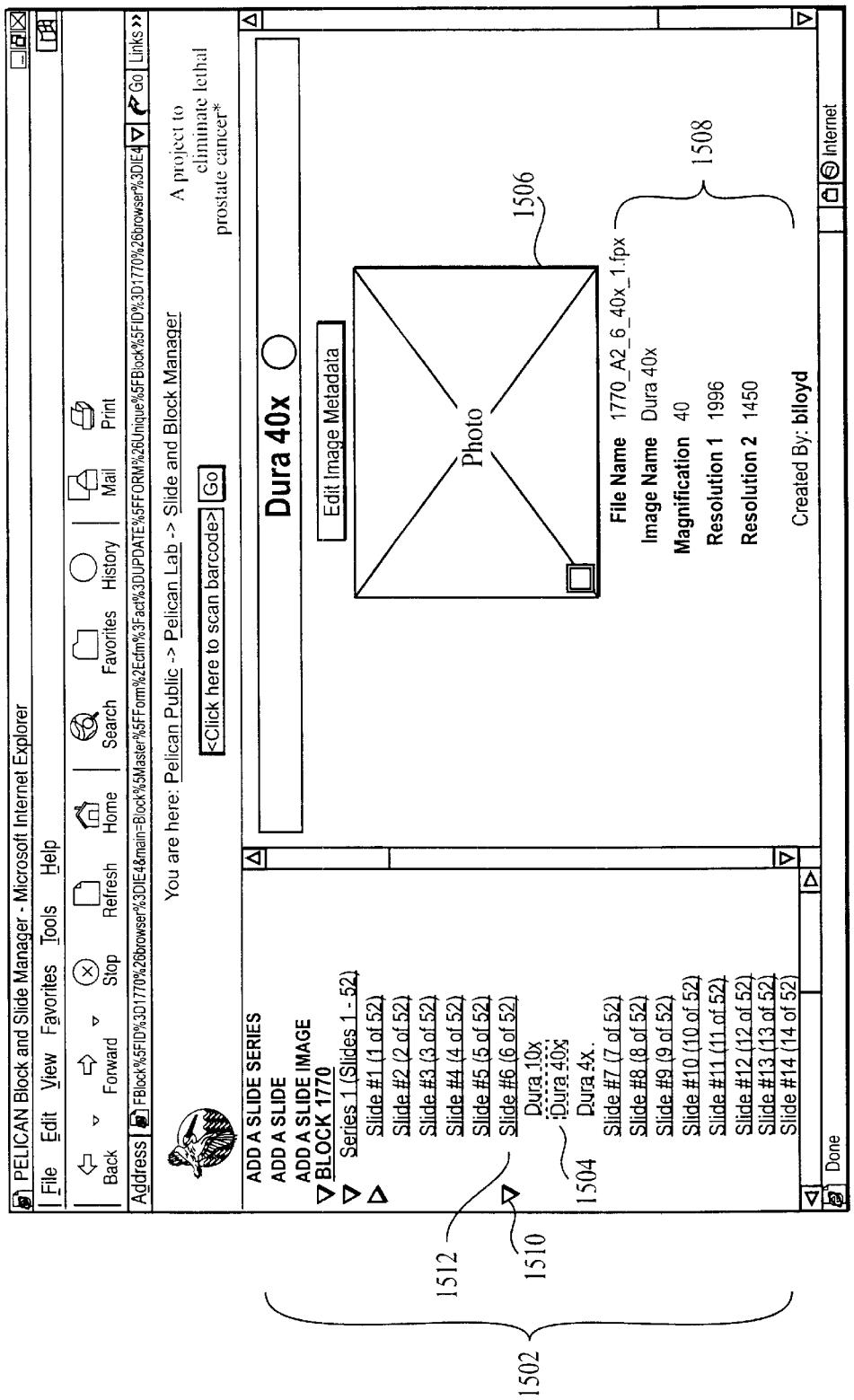

Referring to FIG. 15, when the user searches for data from a particular block, links to all the pertinent data related to the tissue block, including slide images of tissues 1502 may be displayed. By clicking on a link to a particular slide 1512, all of the information available about that slide, e.g., how it was stained, its magnification, may be retrieved 1508. If one or more images have been collected for a particular slide, an arrowhead 1510 appears next to the slide name. By clicking on the arrowhead, the available images may be displayed as one or more links or thumbnail images below the slide. If the user clicks on one of these links or thumbnail images, the image of the selected slide 1506 appears in the right hand frame, with all associated data from that image 1508. The image is displayed in a zoomable format and the user may zoom in or out on parts of the image.

Figure 16:
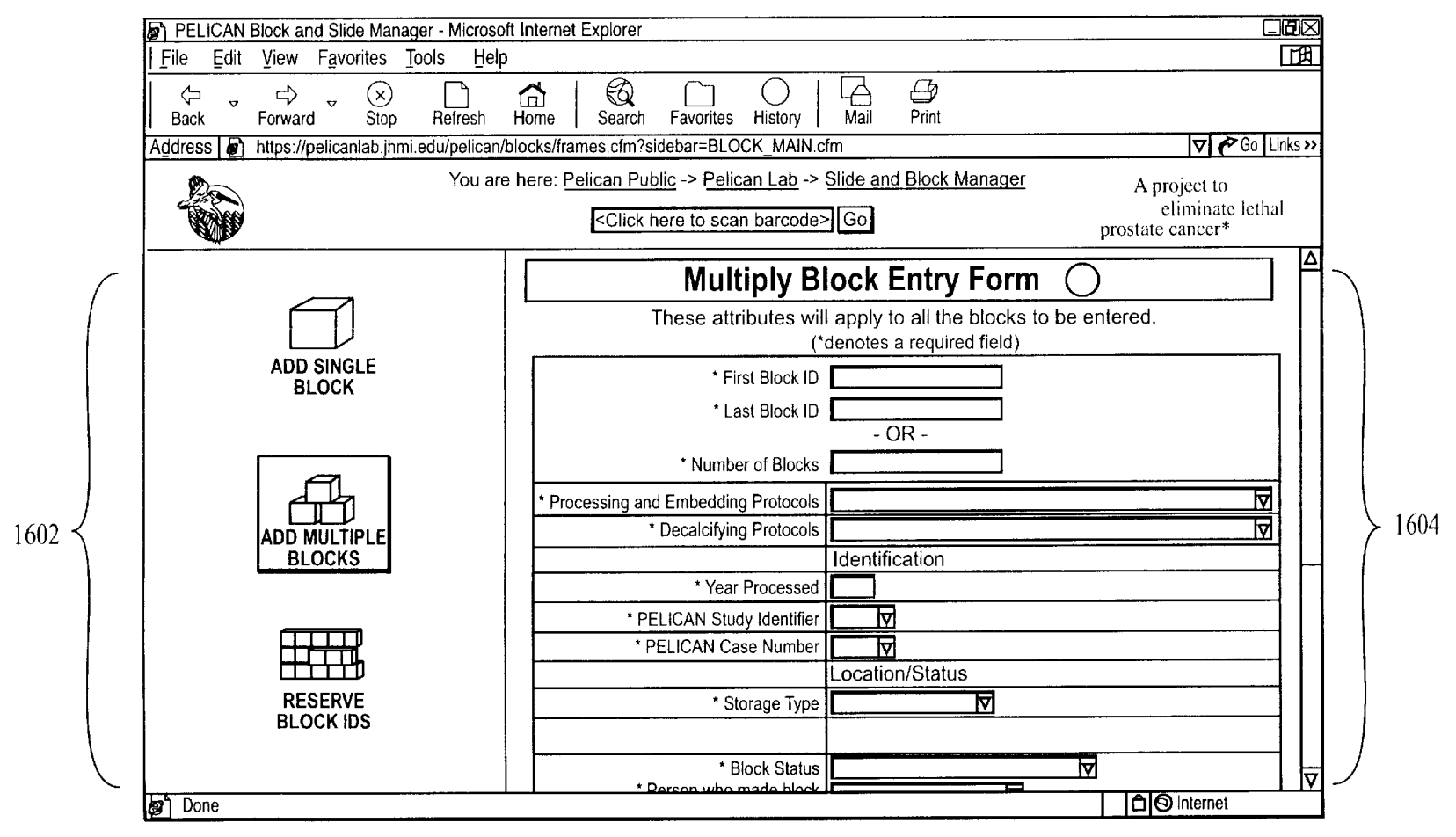

Each tissue block may be designated with a unique block id, and data for single or multiple blocks may be entered into the biomaterials template. Referring to FIG. 16, a user may select whether to enter data for a single block, or multiple blocks, or to reserve block id's for tissue samples 1602. After making this selection, the user is prompted to enter the relevant data into various input fields 1604. Collection of data related to body-fluid samples of any type is similarly enabled through input fields displayed to the user.

Barcode labels for blocks, slides, and body-fluids may be printed as in the Equipment and Supply template. Barcode data may be scanned in from any computer running the DA, directly into the common barcode input area in the header, and the data page for the item scanned may be displayed to the user.

Protocols

The Protocols application may be used to combine, link, and document relationships among data related to equipment, supplies, contacts, biomaterials, procedures, and activity in a laboratory. Moreover, the Protocols application may be used to analyze existing data and to add new data to the database, while maintaining existing connections, links, and relationships among data. Protocols may be used as vectors to documents and links stored in the database, including equipment, supplies, and reagents used, authors of a publication, performers of a study, genes studied, images of biomaterials used, gene function studied, molecular (genetic) data, and reagents and data resulting from the performance of a laboratory procedure. Essentially, protocols track laboratory activity and document the links among different laboratory data as the links are created through laboratory activity by researchers. This methodology allows tracking of all data from the final interpretive phase (e.g., a publication of the results of a study) back to the initial phases of the study through one or many such vectors. This method lends itself to visual representation, and simplifies the process of tracking, comparing, re-enacting, and validating procedures used to obtain data. Moreover, it permits outside researchers to use raw data obtained in a first study for the purposes of performing a second study, in which different questions may be posed and answered than were investigated in the first study. For example, a first research lab may investigate the effect of ultraviolet light exposure on the molecular structure of skin cells and on melanoma incidence. In performing the study, the first research lab may record the tobacco use history of research study participants and record these data in the DA. If a second researcher wishes to investigate the effect of tobacco use on melanoma incidence or on the genetic mutations in skin cells, the second researcher may use the data stored in the database by the first research lab, even if the relevant data were not published in the first research lab's report of the final results of its study.

Figure 17:
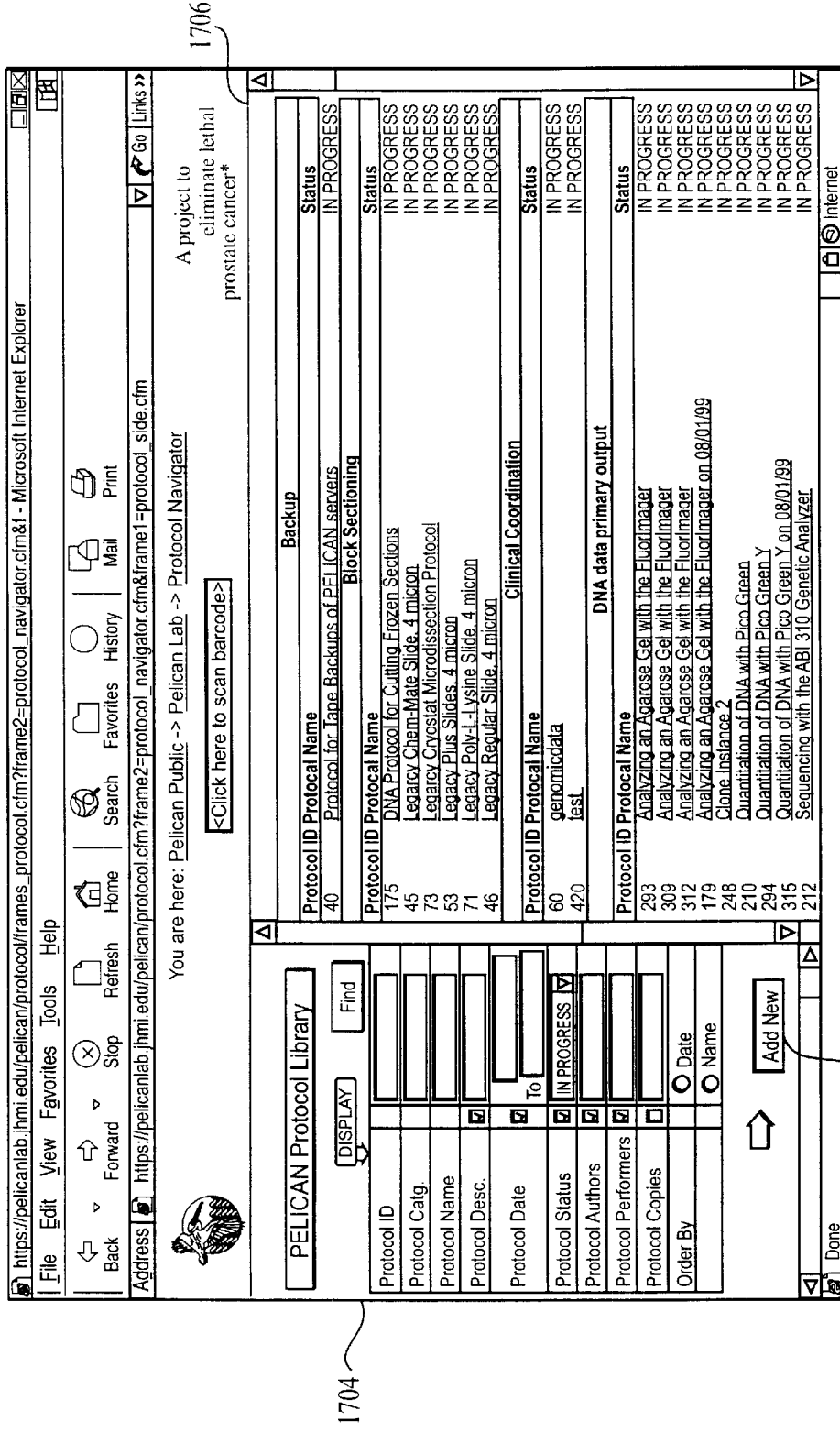
FIG. 17 is an exemplary screen shot of a template for recording protocol information in a database application.

The Protocols application provides a modular process for documenting laboratory procedures by showing links among laboratory data. The following is an example of creating a protocol for documenting sequencing of the TP53 gene in a laboratory. Referring to FIG. 17, after clicking on the protocols link on the front page 200 of the DA to begin the Protocols application, the user may select the "Add New" radio button 1702 in the protocol application left frame 1704. This brings up a menu in the right frame 1706, in which the user is prompted to select a protocol category, insert a protocol name and description, and indicate the final product of the execution of the protocol from a series of radio buttons including "Policy Information," "Maintenance Procedure," "Non-Tissue Reagent," "Tissue Reagent Blocks," "Tissue Reagent—Slides," "Tissue Reagent—DNA," "Tissue Reagent—Proteins," and "Molecular Data"

(not shown). This radio button selection determines what subsequent menus and templates will be provided to the user.

Figure 18:
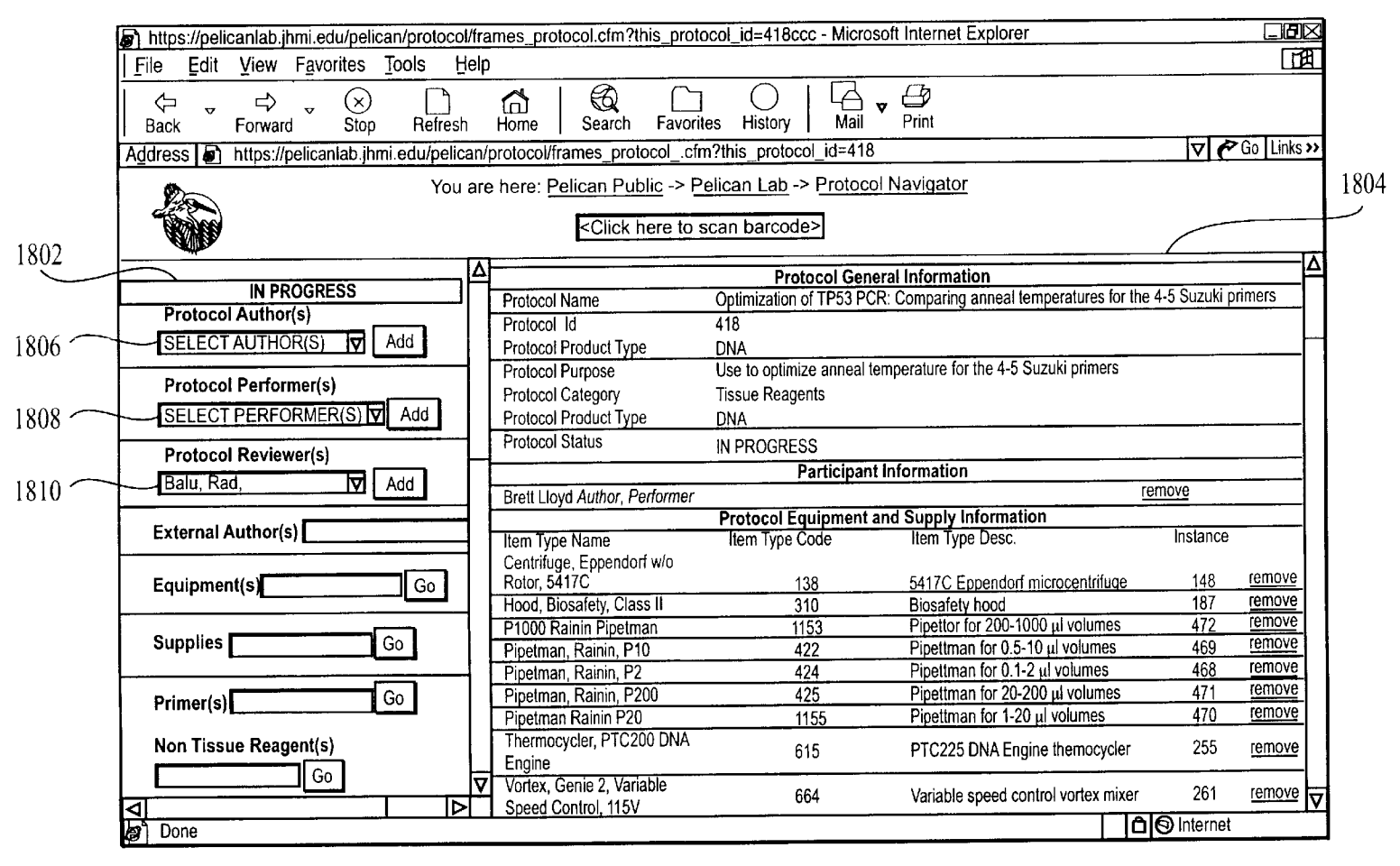

The Protocols application main page contains a search menu for existing protocols in the left frame 1702, and the right frame 1706 defaults to show all protocols that have been started previously, but which have not been completed and which are currently listed as "In Progress." The user may select an existing protocol from the list in right frame 1706 by clicking on a hyperlink to the protocol. After selecting a particular protocol, a protocol control panel (left frame) 1802 and protocol body (right frame) 1804 for the protocol selected may be displayed as shown in FIG. 18. For each protocol in the database, a user may select authors (those who wrote the protocol or contributed significantly to writing the protocol) 1806, performers (those who are doing the work in the lab) 1808, and reviewers 1810, using the protocol control panel 1802. The review function is discussed further below. The user may then enter any external authors of the study (authors not in the contact database), and may then proceed to use the search boxes in the Protocol control panel 1802 to search for and select Equipment, Supplies, Primers (for polymerase chain reactions), Non-Tissue Reagents, and Tissue Reagents to be used in the protocol. Data which have been previously entered into the database may be displayed in the protocol body 1804, so that the user may select the data for inclusion in the protocol by clicking on a link to the data. The user can also scan barcoded items into the barcode area in the header frame to add these items to the protocol.

Figure 19:
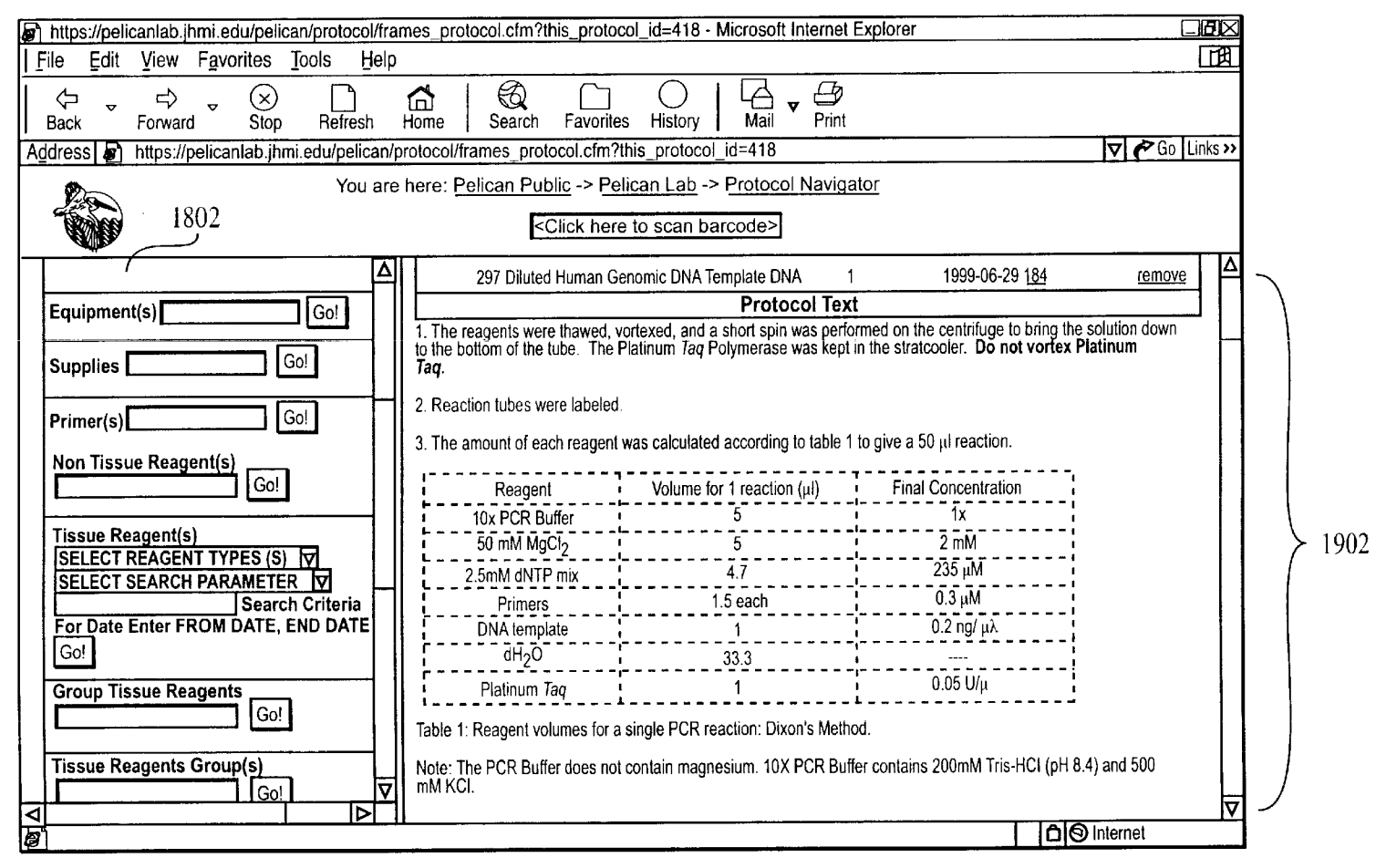

With each search for items to add to the protocol, the user is provided a response screen in the right frame. The user may check off boxes for items desired to be identified with the protocol and may then save the choices in order to add the items to the protocol body in the right frame, which may then reappear with the updated information. The user may then add text to the protocol as shown in right frame 1902 of FIG. 19 to document the steps followed in the protocol.

Figure 20:
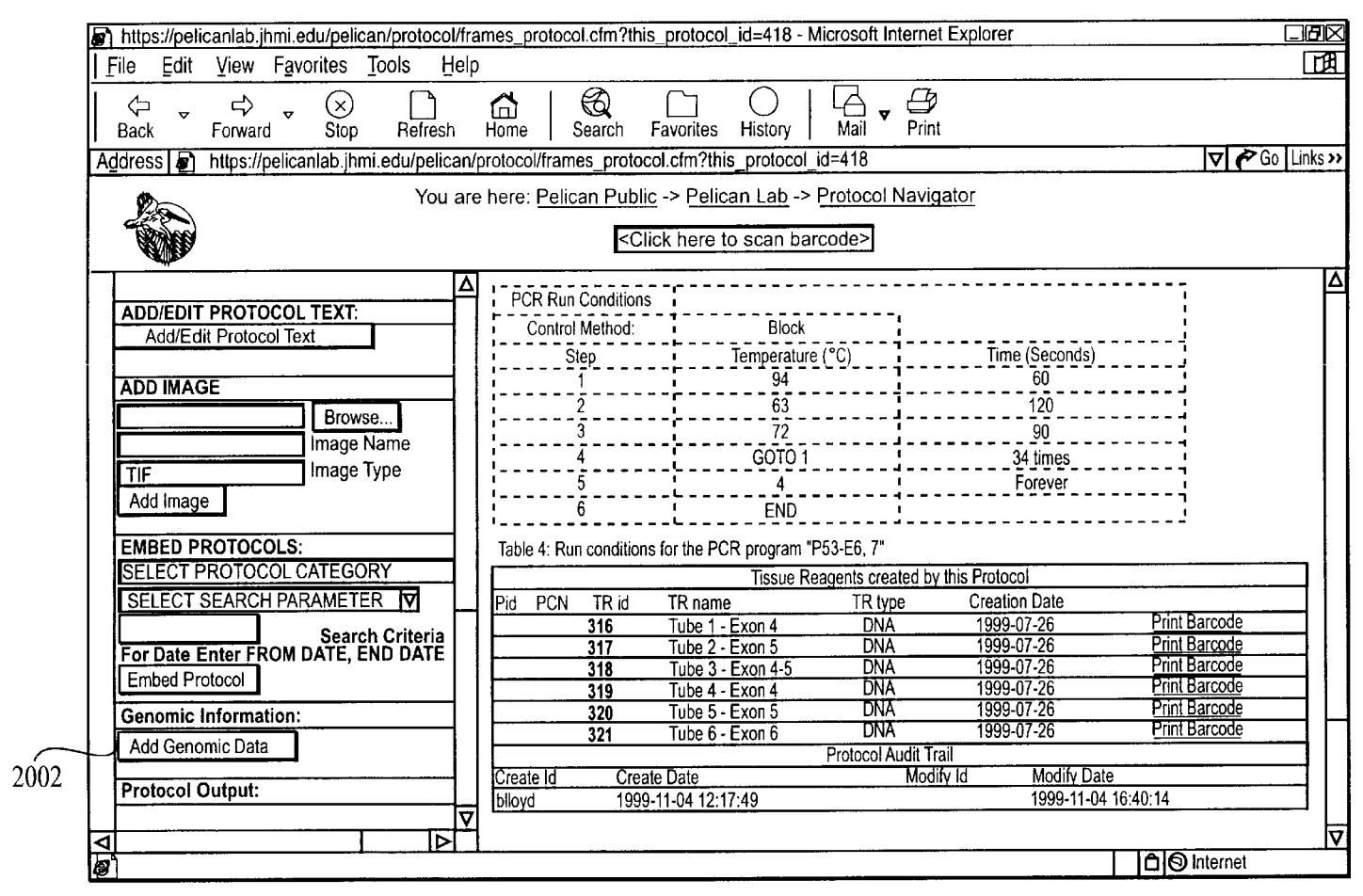
Figure 21:
FIG. 21 is an exemplary screen shot of a template for searching and displaying publicly know genetic information in a database application.

If the user selects "Molecular Data" as the product of a protocol, the "Add Genomic Data" radio button 2002 is provided to the user in the left-hand Protocol Control Panel as shown in FIG. 20. By clicking this button, the user is taken to a Genomic Information panel 2100 as shown in FIG. 21, in which the user may search for the gene name from a list of official gene names and associated information from the National Center for Biotechnology Information (NCBI) or another genetic information database 2102. Once an officially named gene has been selected, the user may select from a list of previously identified gene functions contained within the database for the gene. If the gene function under study is not listed, the user is prompted to enter the gene function, and an official NCBI PubMed ID for a journal reference supporting this function for this gene is provided to the user. The user then indicates the biomolecule under study, from a list including DNA, RNA, cDNA, protein, lipid, and carbohydrate (when an experiment studies more than one of the above, the user is asked to choose one primary focus of the study). If the user chooses DNA, for example, a list of types of DNA-based genomic assay data is provided, which may include sequence information, single strand conformational polymorphism, comparative genomic hybridization, and loss of heterozygosity data.

Figure 22:
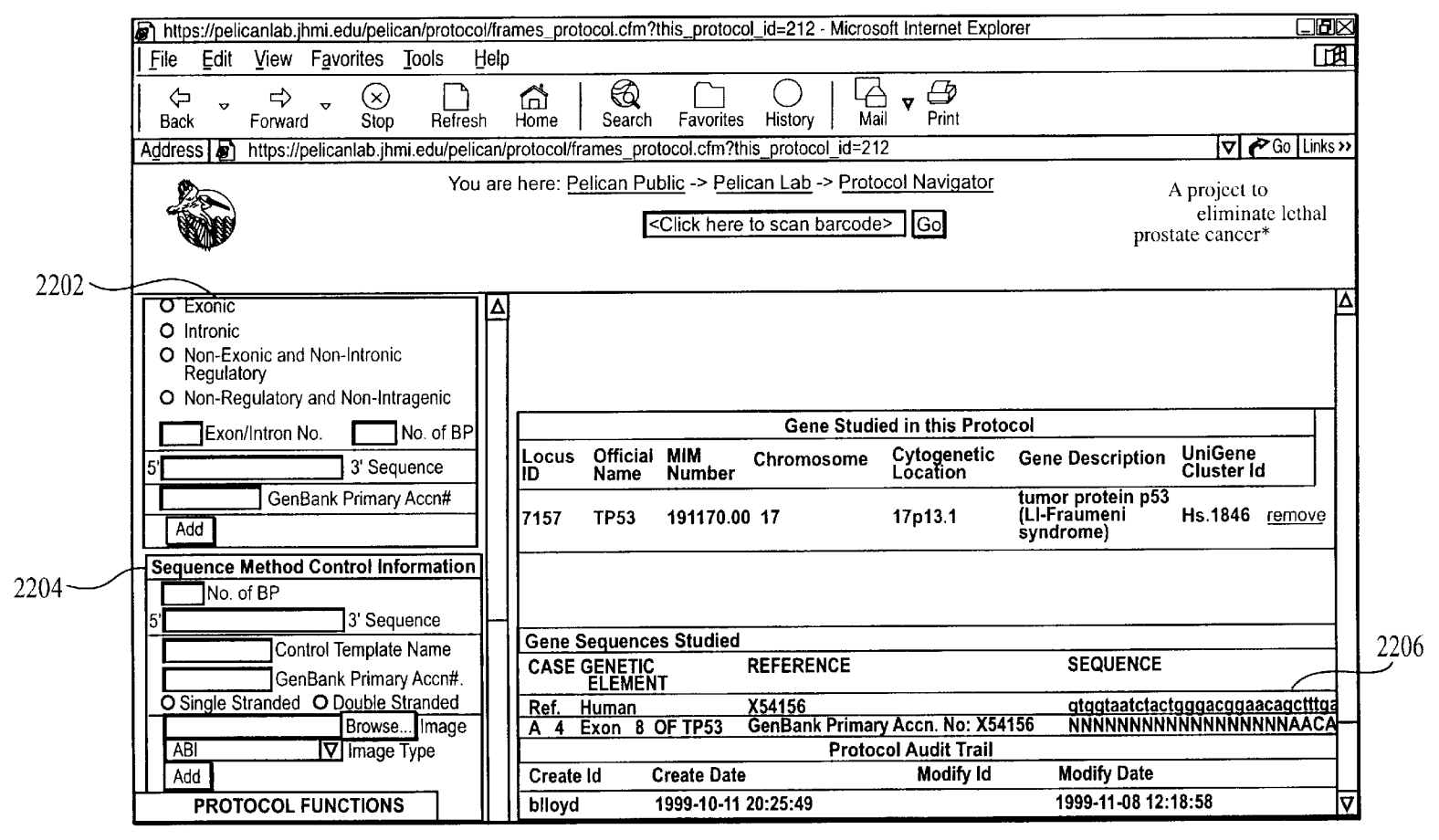

If, for example, the user chooses sequence information, a "Sample Sequence Information" panel 2202 may appear in frame displayed to the user, as shown in FIG. 22. This panel may provide a template for precise specification of the sequencing data to be provided. Selections that may be required as inputs may include sequence origin (nuclear/mitochondrial), type (exonic/intronic/non-exonic, non-intronic regulatory, and nonregulatory, non-intragenic), the exon or intron under study (if this radio button was chosen), the number of base pairs (BP) to be recorded, whether the sequence to be provided is from the coding or non-coding strand, the sequence itself in standard 5'→3' orientation (which is input as text data, with the user supplying the exact number of bases specified), an area to attach images from which data are derived, the image type to be added, the tissue reagent from which the specific data are derived, the GenBank Primary Accession Number(s) for a specific genomic reference sequence, and the requested data input of reference sequence from NCBI Locus Link, which is an annotated subset of a standard reference, such as the GenBank data, and which may be more reliable and less changeable as a reference sequence.

Single or multiple sequences can be added to a protocol, depending on the number of samples under study. The user may be required to provide sequence data for each Tissue Reagent entered into the protocol so as to encourage complete data reporting on each protocol. Below the "Sample Sequence Information" submenu, a "Sequence Method Control Information" submenu 2204 is provided, in which the user may provide data from control reactions validating sequencing reactions performed in the laboratory with the equipment and supplies listed in the protocol.

Images attached to the protocol are referenced next to the data they represent, such as the sequence data 2206, shown in alphanumeric form, and may also be shown in graphical form. Virtually any type of image can be attached to a protocol (and contained within the database in binary form). For example, a gel image demonstrating the PCR products prior to the sequencing of the gene, tables of laboratory data, or microscopic images of tissue samples may be attached to a protocol. Such images may be annotated with text data indicating what is in each lane, or other explanatory text about the image, prior to storing in the database.

Depending on the type of data generated by a protocol, after the data are entered, the protocol performer or reviewer may be asked to interpret the data based on a common format available for that datatype. For example, for sequence data, if a mutation is detected, a reviewer may be asked to annotate the sequence data with the position, base changes, and predicted amino acid effect of a mutation. This information may then be recorded in a format as consistent as possible with existing formats for mutation reporting. When recording loss of heterozygosity data, the presence of loss or gain may be recorded.

When Tissue Reagents such as purified DNA are products of a laboratory protocol, the user is prompted to provide data on each of these reagents, and is given the opportunity to print unique barcode labels for each reagent created. A Tissue Reagent Search Screen is contained in the protocol control panel 1802. Tissue reagents may be categorized into various types to simplify searching, and their location (freezer, refrigerator), source protocol, and other metadata may be searched to locate reagents. A similar search panel is available for Non-Tissue Reagents.

The Protocols application may be used to analyze existing data and to add new data to the database. For example, referring to FIG. 15, images of tissue slides may be stored in the database for later analysis by a reviewer. One or more tissue slide images 1506 may be presented to a reviewer along with a nested set of questions regarding, for example, the overall interpretability of the image, whether the tissue contains cancer, and the Gleason grade of the tissue sample. The reviewer's answers to these questions may then be integrated into the database. By permitting the review of images through a web-based application, the Protocols application permits remote data analysis by widely distributed researchers. By presenting different reviewers with the same tissue sample images and the same questions, the Protocols application standardizes the analysis of the tissue. Standardization of questions may also be implemented in parts of the Protocols application. For example, a standard set of questions requesting information relating to patient histories may be developed and stored in the database. Questions from the standard set of questions may then be pasted in to a new or existing protocol, so that patient histories from the same or different studies may be meaningfully compared.

Data handling algorithms such as the one illustrated above for DNA sequence data are used for each major type of data recorded by a laboratory. As each algorithm is completed, it can be reused by the lab or by any other lab that uses the Template Database. Comparative genomic hybridization data, loss of heterozygosity data, and single strand conformational polymorphism data may also be identified, stored, and searched. Each type of data may have many things in common with previous types (e.g., the need to store images or the need to put data in context of the genome), so the handling of new data types becomes easier with continued use and development of protocols created with the DA. As users come across assay and data types that are not currently listed by the DA, an efficient web-based process of specification of the data type to be handled and the delivery of sample data may be provided to users, to allow the authority in charge of database structure to incorporate the new data type expeditiously and thus avoid user frustration.

Because of their modular design, individual protocols may be copied and used for new lab actions with the least possible repetitive work by the user. As protocols develop, are modified, and slowly "mutate" within labs, small changes may be easily tracked and recorded without reworking an entire document.

Figure 23:
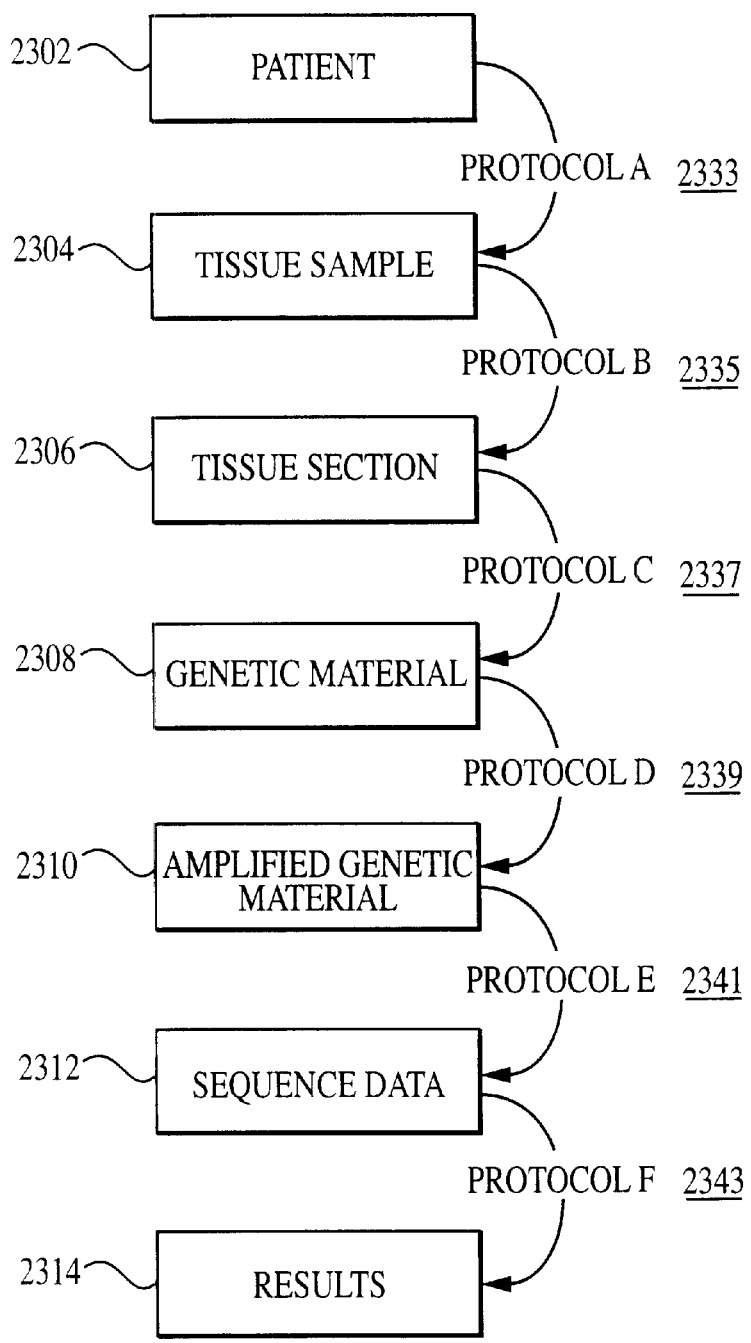
FIG. 23 is a schematic diagram of the protocols linking different kinds of research data.

The Protocol Manager enables the graphical display of data relationships and workflow in a laboratory. Because of the methods used to record and relate information contained in protocols, a pedigree of protocol information for any data set can be displayed in a rapidly searchable, heuristically valuable way. For example, using database information, a pedigree of protocols involved in the generation of gene sequence data may be established, as shown in FIG. 23. Data about a patient or research subject 2302 (e.g., physical character and behavioral characteristics) may be linked to data about a tissue sample or a block of tissue samples 2304 (e.g, where in the organ the tissue was taken, the size of the sample, the date the same was taken, where it was stored) by a protocol A 2333. The protocol A 2333 may describe, for example, how tissue samples were prepared from the patient, and what equipment, supplies, what procedures were used, and who performed the procedures.

Data about tissue samples 2304 may be linked to data about tissue sections 2306 (e.g., how many tissue sections exist, whether images of the sections exist, and links to the images) by a protocol B 2335. The protocol B 2335 may describe how tissue sections were prepared from a block of tissue sample, and what equipment, supplies, and procedures were used to prepare the sections, who performed the procedures, where the tissue sections were stored, whether images of the tissue sections exist, and links to the images.

Data about tissue sections 2306 may be linked to data about purified genetic material 2308 (e.g., what genes were studied, and whether the genes are listed by a nationally known database) extracted from the tissue sections by a protocol C 2337. The protocol C 2337 may describe, for example, how the genetic material was extracted from the tissue samples, who performed the extractions, and what equipment and supplies were used.

A protocol D 2339 may link purified genetic material data to data about amplified genetic material 2310 (e.g., how much material is produced and stored, and the quality of the material). The protocol D 2339 may describe, for example, the methods of amplifying the genetic material, and who performed the procedure. A protocol E 2341 may link amplified genetic material data to sequence data (e.g., the base sequences of genes, mutations observed, images of gel data, etc.) 2312. The protocol E 2341 may describe, for example, how the genetic material was sequenced, what procedures were used, and who performed them.

A protocol F 2343 may link sequence data 2312 to data about a publication of research results 2314 (including, for example, a link to the publication, authors' biographical material, and links to references). The protocol F 2343 may describe decisions made in the publication process that are not evident from the publication itself (e.g., what data were omitted from the final publication, conclusions that were made that did not withstand peer review).

This linked, hierarchical graphical display of linked data allows researchers to track anomalies or other issues related to complex genomic data. Using this data construct, protocols become the abstract informational "vectors" that link physical objects such as tissue and equipment with abstract research results.

When the status of a protocol is completed by a protocol performer, if reviewers are listed for the protocol, a first reviewer (Reviewer1) may be immediately notified (e.g., by email) that the protocol is completed and a URL may be provided within the email message for the reviewer to connect to the review page for the completed protocol. Not all protocols require review, and assignment of reviewers may be based on policies adopted in individual laboratories. For example, protocols for creation of standard laboratory buffers may not need to be reviewed routinely, but the review of all data-producing protocols, first by the performer of the protocol, then by the lab manager, and finally by the lab director may be mandatory.

In the review function, the designated reviewer is electronically presented with a review page containing the completed protocol information in a top frame of the page, and with a series of protocol review questions to answer in the lower frame of the page. Protocol performers decide when a protocol is complete and when to begin database-enabled review of an individual protocol. The first phase of the three-phase review process pertains to evaluation of the quality of certain basic protocol data, and is applicable to all protocols entered into the database. The reviewer may be required to answer whether the authorship and/or performer names are correct, whether the protocol category is correct, whether the protocol name is accurate, whether the protocol text is clear, whether the equipment/supplies included are correct, whether the NTR (non tissue reagent) selection is correct, whether the TR (Tissue Reagent) selection is complete, whether embedded protocols are correct, whether or not the protocol represents the state of the art for the home laboratory, and to review the overall quality rating of the data in the protocol.

The second and third phases of the protocol review process pertain only to protocols producing molecular data, for example, genomic sequence data, mRNA or cDNA expression data, comparative genomic hybridization data, immunostaining data. The second review phase focuses on evaluation and annotation of data of the specific molecular datatype produced in the protocol under review. For example, if the protocol is a sequence data-producing protocol, for each set of sequence data attached to a specific TR, the user is required to declare whether a mutation is present, and if so, what type (based on a validated list of mutation types), and to designate the specific genomic, cDNA, and protein position and real or predicted alteration in sequence caused by this change, in addition to a confidence level in this data, and notes on the specific sequence data. In the third phase of the protocol review process, the user is presented with all molecular data for which the second review phase has been completed from the database for the specific TR's, gene, and gene functions studied in the current protocol. The reviewer then makes a "functional genomic" determination for each of the genes and gene functions under study based on a cognitive summation of these previously reviewed data, including those data in the current protocol. In making a functional genomic determination the reviewer categorizes the function of the gene under study as "normally on," "normally off" "abnormally on," "abnormally off," "|off|," "|on|," or to states the data are inadequate to determine the gene's function. "Normally on" means that a gene (overall) or gene function is demonstrably and preponderantly on in user-specified reference normal tissue during a normal day in an adult organism, and is demonstrably on in the experimental tissue under study. "Normally off" means that this gene function is demonstrably and preponderantly off in user-specified reference normal tissue during a normal day in an adult organism, and is likewise demonstrably off in experimental tissue under study. "Abnormally on" means that this gene function is demonstrably and preponderantly off in user-specified reference normal tissue during a normal day in an adult organism, but is demonstrably and preponderantly on in experimental tissue under study. "Abnormally off" means that this gene is demonstrably and preponderantly on in user-specified reference normal tissue during a normal day in an adult organism, but is demonstrably and preponderantly off in experimental tissue under study. |On| means that the gene function is demonstrably and preponderantly on in the experimental tissue under study but that no comparison user-specified normal tissue is available, or the normal tissue data is uninterpretable. |Off| means that the gene function is demonstrably off in the experimental tissue under study but that no comparison user-specified normal tissue is available or the normal tissue data is uninterpretable. "No data" means no interpretable data are available for a specific |gene status| or gene function. Separate determinations of gene function are made for each tissue block sample. If there is a discrepancy in results between samples in a given patient, the reviewer is asked to make the best summary judgment, but the fact that there is a discrepancy is separately recorded for this summary data point. The reviewer rates his or her confidence in the determination as low, medium, or high, and the rating is recorded with the reviewer's categorization. All base data are considered when making such a determination, but a reviewer may accord more or less weight to particular data, based on the quality of the base data. The reviewer is then asked again to make the same judgment of the gene's status, in a "Fully Integrated" genomic context, where the reviewer is presented with a menu of all other pertinent genomic data in the database for that particular sample and/or group of samples.

This functional genomic summarization process is carried out first at the TR level, and then ascends to a Sentinel Subgroup level (if the user has specified Sentinel Subgroups for the Tissue Reagents), and finally at the entire Study Subject level. At each level of summarization, the user is asked to summarize the abnormality where any abnormality has been detected. Upon completion of the review by the first reviewer, the user declares the review complete, and if a second reviewer is listed on the protocol, the second reviewer is automatically notified.

For example, if comparative genomic hybridization (CGH) data were contained in the database in addition to the sequence data attached to a particular protocol when the protocol passes the first stage of the review process, and after the reviewer completes the per sample and per patient judgment based on the protocol data alone, the reviewer is then presented with a list of other relevant genomic data types available for each sample and each patient. "Relevant" data types for a specific Tissue Reagent sample are any data that are tied to the same gene and/or gene function under study, or, for positional data, such as CGH data, any data available from the same chromosome, or region of the chromosome if the exact relative position of a gene is known.

Linkage of gene function data and positional data methodology is discussed below. The reviewer may click on each of the links to each of the data types listed, consider all the data together, and again come to a "best judgment" of whether the specific gene (as a whole) and/or gene function is, for example, normally on or normally off. If, for example, in a protocol under review, a mutation is detected and predicted to truncate a particular protein and render it totally nonfunctional, the reviewer would judge the gene and all known gene functions to be "abnormally off" because the gene for making the protein is sometimes on during a normal day in a cell derived from the tissue of origin, but the data would not be certain because it is possible that another non-mutated copy of the gene is present in the cell, and was not detected in the sequencing reaction. If, however, the reviewer considers the sequence data along with CGH data from chromosome 17 indicating loss of copy number in the region of the gene in the same tissue reagent sample, the confidence level that this gene is in fact abnormally off in the tissue under study goes up dramatically, and the reviewer would likely record the summary data for the gene (overall) and specific functional data as "high confidence for being abnormally off," where the confidence level would probably only have been "medium" if only the sequence data or only the CGH data were considered in isolation.

Tissue removed from patients as part of biopsy, surgery, and autopsy procedures provides valuable information about diseased biological systems. Such tissue-based studies are useful complements to in vitro and laboratory animal research on a given disease, because of well-known differences in biological behavior between species and wildly different behavior of cells in vitro compared to in vivo. Use of a functional genomic symbology does not obviate interpretation using current methods. The mechanism for recording this symbology is designed to be changeable when new data are added, or if old data need to be reinterpreted. The protocol application permits the extraction of functional data from static tissue, the opportunity for comparing genomic function over time, in that the user may choose to study tissues obtained at times in a patient's life, or tissues obtained before, during, and/or after, specific interventions in a patient or laboratory animal. Finally, by providing a common format for describing results, the protocol application allows the comparison of results across studies, such as, for example, from one cancer to another.

Once a single reviewer has marked a review as completed and submitted it to the database, the next reviewer (if any) is notified (e.g., by email) and similarly reviews and comments on the findings and on the previous review if indicated. Each reviewer has the ability to change the previous functional interpretation of the data if he or she disagrees with the interpretation. Thus, the most senior or most experienced personnel in a lab most likely is the last intralab reviewer, similar to implicit current practice. When the last reviewer has declared a review complete, the protocol itself and the attached base data (images, interpretations of images) becomes fixed and cannot subsequently be changed. However annotations to protocols are allowed in a dated format, and may be appended at the end of each protocol with the name and date of each entry. Also, as stated above, the functional genomic interpretation of data within a protocol can be changed subsequently, based on reinterpretation of data.

Specific functions for most human genes at present are unknown, and for the remainder are only partially known. The DA is structured to enable parallel growth in understanding and knowledge of gene function in normal and abnormal circumstances by prompting the scientist-submitter to identify all results according to specific named genes (using accepted names), and, when possible, to provide referenced gene function definitions. Where no gene functional attributes are known or hypothesized, the data are linked only to the gene name, and imputed affects on function (e.g., "normally on," "normally off") are categorized by |gene status| alone. This methodology allows recategorization of |gene status| data at a later time when specific gene functions are known.

Where a gene is known but does not yet have an official name, the user may be required to submit the gene to the appropriate authorities (e.g., human genome organization (HUGO) or the NCBI) prior to entering data related to it in the database. Frequent downloads of the accepted gene names allow a new gene to appear in the database within a short time if naming authorities respond quickly.

Referential linkage of gene-specific data to positional data may occur through combination of the latest and most accurate Gene Mapping data (e.g., GeneBridge 4 from Genome Maps 1999) and overall map length for a given chromosome. For example, gene tp53 is located at 54.01 cR (centiRays) on the GeneBridge 4 map. The total length of chromosome 17 on this map is 544.07 cR. The relative position of tp53 the map is thus 54.01/544.07 or 0.1 FLpter (fractional length from p-arm telomere). Comparative genomic data is also reported in position relative to the total length of the chromosome, and these data can also be converted to Flpter values. Thus, if a gene has been mapped, a common position format is available for consideration of both gene-specific and positional data, such as loss of heterozygosity. This methodology is only as accurate as the maps used to generate the data. However, even with some imprecision in map locations, the ability to relate gene position to other purely positional data in a programmatic way may be very useful.

The structure of the database puts equal emphasis on "normal" and "abnormal" data, and integrates these two categories of data, rather than reporting only isolated "abnormal" data. The integration of normal and abnormal data, could be instrumental to the success of research efforts particularly in cancer because it is the "normal" pathways in cancer cells for which there is no redundancy that may be most sensitive to pharmaceutical or other inactivation. In other words, normal cells have multiple redundant pathways for many cellular functions. Cancer cells are likely to lack such redundancy for some or many pathways. Knowledge of which pathways remain normal and have no backup in a cancer cell may provide the best targets for improved therapy.

Scientific Query Builder

The Scientific Query Builder supports extraction of key data variables from the database through inherent human pattern recognition abilities, and through computer-encoded pattern recognition algorithms. Essentially, the Query Builder allows specific detailed data and/or summary data to be queried from the entire database, and presents the data in a graphical format linked to all underlying data. For example, a user may query the database for all data from all studies in the database relating to prostate cancer patients who ever smoked cigarettes with abnormalities in either the p53 or PTEN genes, and the user may further specify that data of the patients' initial bx (biopsy) Gleason scores and weight loss or gain status should be displayed. A subscriber to the database may run the query over all the data in the database to return the results from all data stored within the database, along with links to protocols used to produce the data, and links to underlying data from which the returned data are derived.

Continuing with the example of the search for data related to smokers with prostate cancer and p53 or PTEN gene abnormalities, the functional genomic data returned from the query may be color coded for high information content viewing of the data. For example, the condition of a patient's gene functionality may be represented by a rectangular datacell symbol, which may be black to indicate abnormal gene function and green to represent normal gene function. If the gene function is off, the perimeter of the rectangle may be red, and if it is on, the perimeter of the rectangle may be black. Representation of Gleason score, weight loss, tobacco use, and other data may be similarly encoded to provide maximum information content to the viewer in a small spatial area. While examining the data, when the user becomes interested in a certain pattern within the data and wishes to examine the data underlying it, simply clicking on the datacell representing the data in question leads to the summary data supporting. Summary data may indicate how the data represented by the data cell were acquired (e.g, what protocols were used to produce it) and what the supporting data for the data represented by the datacell are. The user can go even farther if desired, and view the protocol used for the data shown, and any protocols intermediate between collection of the tissue and generation of the data, perhaps first in pedigree form, and then drilling further to view a specific protocol. Thus, the user may review and analyze the results of specific queries.

Statistical analysis of the extracted data is enabled by functionality provided by the DA. For example, the application may provide summaries of numbers of samples within each category, with percentages or other statistical measures. Such data may be presented in a format suitable for export to spreadsheets for further analysis as required. Output of data such as repeated blood measurements over time plotted on a graph or time intervals for specific treatments may also be enabled and may be displayed side by side with molecular data. Molecular data types that are not in the "functional" format, such as specific loss of heterozygosity or mutation data, may also be displayed.

The Project Manager, Patients, Contact Manager, Equipment and Supplies, Biomaterials, Protocols, and Scientific Query Builder applications are designed for daily use in a laboratory setting. The laboratory may determine what data are input into the database, and how they are reviewed and maintained. The laboratory may allow people outside the lab to view data in one of two ways. Collaborative agreements between the laboratory and an outsider may give authority to an outsider to use the DA to view and/or add to and/or search selected or all data within the laboratory's local database. Specific patients may be allowed to view their own research data in appropriate settings (i.e., with researchers or others able to discuss the data), which may provide an incentive for patients to participate in research. The laboratory may also publish datamorphs from the database. When publishing a datamorph, the specific results of a query with all underlying table data may be saved as a single unit (datamorph). An introduction and discussion of the data and appropriate references may be appended, and the entire "completed datamorph" may be submitted for consideration to a publication database. Once published, all data relationships within the datamorph are maintained and the ability to search within and among datamorphs is enabled.

The DA also enables sharing of materials in addition to sharing of information. Laboratories often share reagents, and often laboratories spend a large amount of time in administering such sharing, without reimbursement and without any clearly organized structure or logging process. Thus, the Biomaterials application may allow a lab to publish the availability of specific reagents that other laboratories may request and gain approval to obtain. Payment and shipping of the reagents may occur in a similar fashion using existing web commerce methods.

Yet another emergent property of the system is that in many ways it may lessen inequities in giving scientific credit for work performed. In the current system, first and last authors of papers are often given disproportionate credit for work done. With the system described here, during each step of the project manager, equipment and supply, biomaterials, protocol, and review process, each person's contribution to the research project is recorded accurately and accounted for.

Use of the DA by laboratories conducting scientific research on human patients may provide an opportunity to create a constructive way for patients to become more aware and informed about the research. Having patients interested, involved, and knowledgeable about the research process, as it affects them, may help advance scientific research and help our culture adapt better to new knowledge and techniques for diagnosing and treating disease.

The techniques, methods, and systems described here may find applicability in any computing or processing environment. Various implementations of the systems and techniques described here may be realized in digital electronic circuitry, or in computer hardware, firmware, software, or in combinations thereof. A system or other apparatus that uses one or more of the techniques and methods described here may be implemented as a computer-readable storage medium, configured with a computer program, where the storage medium so configured causes a computer system to operate on input and/or generate output in a specific and predefined manner. Such a computer system may include one or more programmable processors that receive data and instructions from, and transmit data and instructions to, a data storage system, and suitable input and output devices. Each computer program may be implemented in a high-level procedural or object-oriented programming language, or in assembly or machine language if desired; and in any case, the language may be a compiled or interpreted language. Suitable processors include, by way of example, both general and special purpose microprocessors.

Generally, a processor will receive instructions and data from a read-only memory and/or a random access memory. Storage deices suitable for tangibly embodying computer instructions and data include all forms of non-volatile memory, including semiconductor memory devices, such as EPROM, EEPROM, and flash memory devices; magnetic disks such as internal hard disks and removable disks; magneto-optical disks; and CD-ROM disks.

These elements also can be found in a conventional desktop or workstation computer as well as other computers suitable for executing computer programs implementing the methods described here, which can be used in conjunction with any content viewing or manipulation software, or any other software capable of displaying portions of a larger body of content. Any of the foregoing may be supplemented by, or implemented in, specially designed ASICs (application specific integrated circuits).

Figure 24:
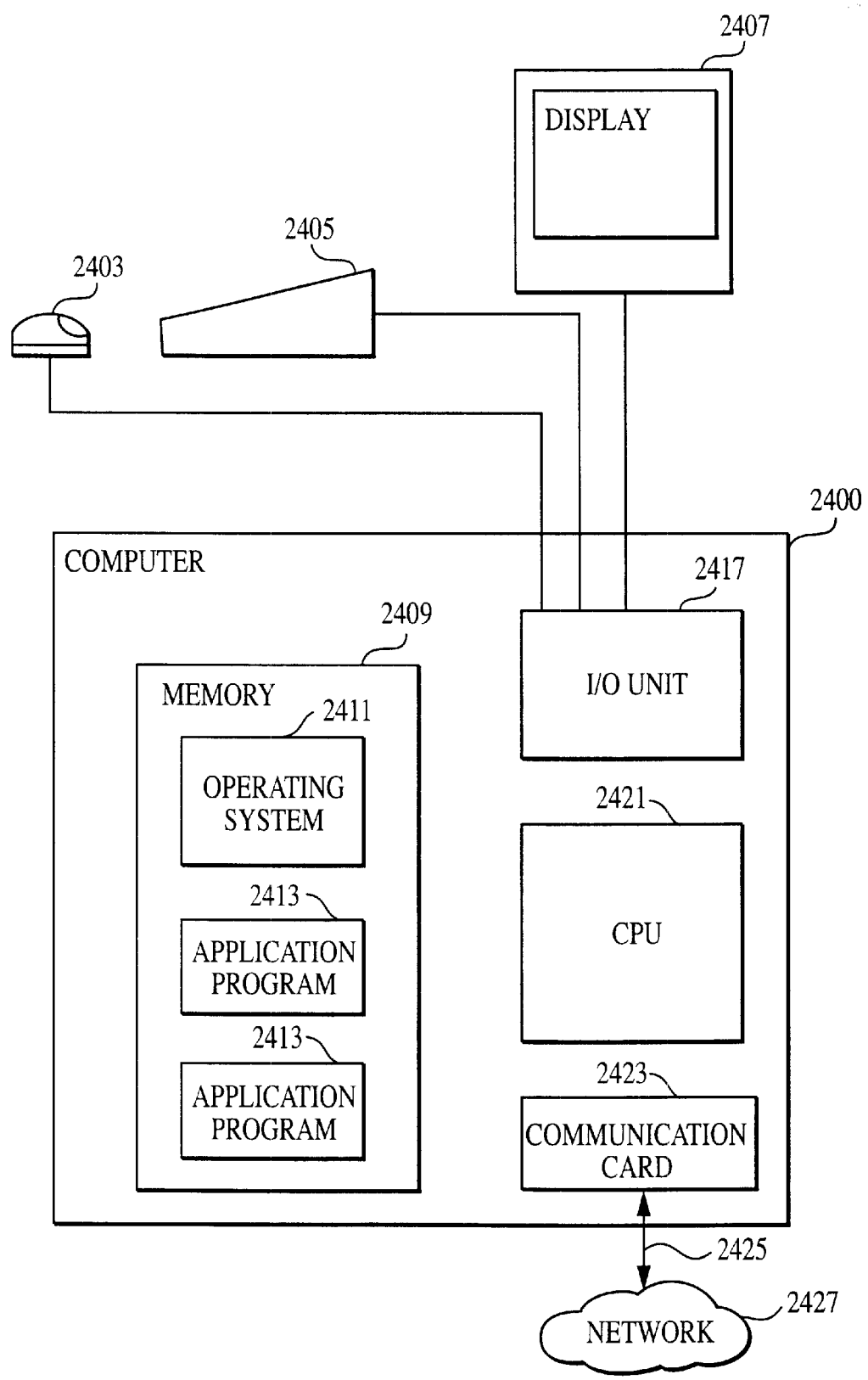
FIG. 24 is a block diagram of a computer system.

Referring to FIG. 24, a computer system 2400 represents a hardware setup for executing software that allows a user to perform tasks such as store, viewing, editing, retrieving, and downloading research results and data upon which the research results are based—that is, any combination of text, images, numbers, hyperlinks, and links to other objects. The computer system 2400 of FIG. 24 may also be programmed with computer-readable instructions to enable data to be perceived as stored, viewed, edited, retrieve, downloaded, and otherwise manipulated.

The computer system includes various input/output (I/O) devices (mouse 2403, keyboard 2405, display 2407) and a general purpose computer 2400 having a central processor unit (CPU) 2421, an I/O unit 2417 and a memory 2409 that stores data and various programs such as an operating system 2411, and one or more application programs 2413. The computer system 2400 preferably also includes some sort of communications card or device 2423 (for example, a modem or network adapter) for exchanging data with a network 2427 via a communications link 2425 (for example, a telephone line).

A number of embodiments of the invention have been described. Nevertheless, it will be understood that various modifications may be made without departing from the spirit and scope of the invention. Accordingly, other embodiments are within the scope of the following claims.

What is claimed is:

1. A method of distributing research data from a common database to a user of the common database, the method comprising:

storing data concerning research results in a local database;

storing data upon which the research results are based in the local database;

storing information concerning protocols used in generating the research results in the local database;

linking the data concerning research results to the data upon which the research results are based;

linking the information concerning protocols used in generating the research results to the data concerning research results and to the data upon which the research results are based;

selectively extracting data concerning research results and data upon which the research results are based from the local database to the common database;

selectively extracting information concerning protocols used in generating the research results from the local database to the common database;

distributing to a user of the common database research data selected by the user from the extracted data concerning research results and the data upon which the extracted data are based and distributing to a user of the common database research data selected by the user from the information concerning protocols used in generating the research results.

2. The method of claim 1 wherein distributing the research data comprises distributing the data concerning research results and the data upon which the research results are based in a defined database table structure.

3. The method of claim 1 wherein distributing the research data comprises giving a reviewer electronic access to the data concerning research results and to the data upon which the research results are based.

4. The method of claim 3 wherein the user is a reviewer and distributing the research data further comprises requiring the approval of a reviewer before the research data are publicly distributed.

5. The method of claim 1 wherein the data upon which the research results are based include phenotype data and genotype data.

6. The method of claim 1 wherein the data upon which the research results are based include information concerning equipment and supplies used in generating the research results.

7. The method of claim 1 wherein the data upon which the research results are based include information concerning biomaterials used in generating the research results.

8. A system for distributing research data, the system comprising:

a processor;

an output device for viewing the research data; and memory for storing instructions performed by the processor for:

storing data concerning research results in a local database;

storing data upon which the research results are based in the local database;

storing information concerning protocols used in generating the research results in the local database;

linking the data concerning research results to the data upon which the research results are based;

linking the information concerning protocols used in generating the research results to the data concerning research results and to the data upon which the research results are based;

selectively extracting data concerning research results and data upon which the research results are based from the local database to the common database; selectively extracting information concerning protocols used in generating the research results from the local database to the common database;

distributing to a user of the common database research data selected by the user from the extracted data concerning research results and the data upon which the extracted data are based; and distributing to a user of the common database research data selected by the user from the information concerning protocols used in generating the research results.

9. The system of claim 8 wherein the instructions comprise instructions for distributing the data concerning research results and the data upon which the research results are based in a defined database table structure.

10. The system of claim 8 wherein the instructions comprise instructions for giving a reviewer electronic access to the data concerning research results and to the data upon which the research results are based.

11. The system of claim 10 wherein the user is a reviewer and the instructions further comprise instructions for requiring the approval of a reviewer before the research results are publicly distributed.

12. The system of claim 8 wherein the data upon which the research results are based include phenotype data and genotype data.

13. The system of claim 8 wherein the data upon which the research results are based include information concerning equipment and supplies used in generating the research results.

14. The system of claim 8 wherein the data upon which the research results are based include information concerning tissues and body-fluids used in generating the research results.

15. A computer program, residing on a computer-readable medium, for distributing research data, comprising instructions for causing a computer to:

store data concerning research results in a local database;

store data upon which the research results are based in the local database;

store information concerning protocols used in generating the research results in the local database;

link the data concerning research results to the data upon which the research results are based;

link the information concerning protocols used in generating the research results to the data concerning research results and to the data upon which the research results are based;

selectively extract data concerning research results and data upon which the research results are based from the local database to the common database; selectively extract information concerning protocols used in generating the research results from the local database to the common database;

distribute to a user of the common database research data selected by the user from the extracted data concerning research results and the data upon which the extracted data are based; and distribute to a user of the common database research data selected by the user from the information concerning protocols used in generating the research results.

16. The computer program of claim 15, further comprising instructions for causing a computer to distribute the data concerning research results and the data upon which the research results are based in a defined database table structure.

17. The computer program of claim 15, further comprising instructions for causing a computer to give a reviewer electronic access to the data concerning research results and to the data upon which the research results are based.

18. The computer program of claim 17 wherein the user is a reviewer and further comprising instructions for requiring the approval of a reviewer before the research results are publicly distributed.

19. The computer program of claim 15 wherein the data upon which the research results are based include phenotype data and genotype data.

20. The computer program of claim 15 wherein the data upon which the research results are based include information concerning equipment and supplies used in generating the research results.

21. The computer program of claim 15 wherein the data upon which the research results are based include information concerning tissues and body-fluids used in generating the research results.

* * * * *